US008495760B2

(12) United States Patent
Butte et al.

(10) Patent No.: US 8,495,760 B2
(45) Date of Patent: Jul. 23, 2013

(54) ATOMIC FORCE MICROSCOPE MANIPULATION OF LIVING CELLS

(75) Inventors: Manish J Butte, Stanford, CA (US); Marc Amor Bruce, Stanford, CA (US); Jianwei Liu, Mountain View, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 45 days.

(21) Appl. No.: 13/307,882

(22) Filed: Nov. 30, 2011

(65) Prior Publication Data

US 2012/0137394 A1 May 31, 2012

Related U.S. Application Data

(60) Provisional application No. 61/418,013, filed on Nov. 30, 2010.

(51) Int. Cl.
*G01N 13/16* (2006.01)
*G01Q 10/00* (2010.01)
*G01Q 60/24* (2010.01)
*G01Q 70/08* (2010.01)

(52) U.S. Cl.
USPC .......... 850/1; 850/5; 850/33; 850/56; 850/58; 73/105; 435/6.19

(58) Field of Classification Search
USPC .......... 850/1, 5, 33, 56, 58; 73/105; 435/6.19
See application file for complete search history.

(56) References Cited

U.S. PATENT DOCUMENTS

| | | | |
|---|---|---|---|
| 6,762,025 B2 * | 7/2004 | Cubicciotti | 435/6.12 |
| 7,407,814 B2 * | 8/2008 | Roukes et al. | 436/518 |
| 7,775,088 B2 * | 8/2010 | Ruby | 73/105 |

OTHER PUBLICATIONS

A. Ebner, L. Wildling, et al., "Functionalization of probe tips and supports for single-molecule recognition force microscopy", "STM and AFM Studies on (Bio)molecular Systems", 2008, pp. 29-76, Publisher: Springer-Verlag, Published in: Berlin, Germany.

E. Evans and K. Ritchie, "Dynamic Strength of Molecular Adhesion Bonds", "Biophysical Journal", 1997, pp. 1541-1555, vol. 72, No. 4, Publisher: Biophysical Society, Published in: http://pdn.sciencedirect.com/science.

J. L. Nutter and J. Bechhoefer, "Calibration of Atomic-Force Microscope Tips", "Review of Scientific Instruments", 1993, Page(s) pp. 1868-1873, vol. 64, Publisher: American Institute of Physics, Published in: http://rsi.aip.org/resource/1/rsinak/v64/i7/p1868_s1?isAuthorized=no.

(Continued)

*Primary Examiner* — Nikita Wells
(74) *Attorney, Agent, or Firm* — Evans & Molinelli PLLC; Eugene J. Molinelli

(57) ABSTRACT

Techniques for atomic force microscope manipulation of living cells include functionalizing a nanoscale tip of a microscale cantilever with a first ligand for a first receptor associated with a surface of a first type of cell. The method further comprises, controlling the cantilever to cause the first ligand on the nanoscale tip to contact the first receptor on a surface of a living cell of the first type in a particular temporal pattern to induce a target response by the living cell. Other techniques for controlling an atomic force microscope comprising a nanoscale tip include controlling the cantilever to cause the nanoscale tip to contact a living cardiomyocyte at a predetermined pressure. The cantilever is also controlled to turn off vertical deflection feedback after contacting the cardiomyocyte and collecting deflection data that indicates a time series of nanoscale vertical deflections of the microscale cantilever caused by the living cardiomyocyte.

22 Claims, 29 Drawing Sheets

OTHER PUBLICATIONS

I. H. Park, P. H. Lerou, et al., "Generation of human-induced pluripotent stem cells", "Nature Protocols", 2008, pp. 1180-1186, vol. 3, No. 7, Publisher: Nature Publishing Group, Published in: http://www.nature.com/nprot/journal/v3/n7/full/nprot.2008.92.html.

N. Sun, N. J. Panetta, et al., "Feeder-free derivation of induced pluripotent stem cells from adult human adipose stem cells", "Proceedings of the National Academy of Sciences", 2009, pp. 15720-15725, vol. 106, No. 37, Publisher: National Academy of Sciences, Published in: http://www.pnas.org/content/early/2009/09/04/0908450106.full.pdf+html.

E. Wojcikiewicz et al., "Force Spectroscopy of LFA-1 and Its Ligands, ICAM-1 and ICAM-2", "Biomacromolecules", 2006, pp. 3188-3195, vol. 7, No. 11, Publisher: ACS Publications, Published in: http://pubs.acs.org/doi/pdf/10.1021/bm060559c.

L. Yang, M. H. Soonpaa, et al., "Human cardiovascular progenitor cells develop from a KDR+ embryonic-stem-cell-derived population", "Nature", 2008, pp. 524-528, vol. 453, Publisher: Nature Publishing Group, Published in: http://www.nature.com/nature/journal/v453/n7194/full/nature06894.html.

* cited by examiner

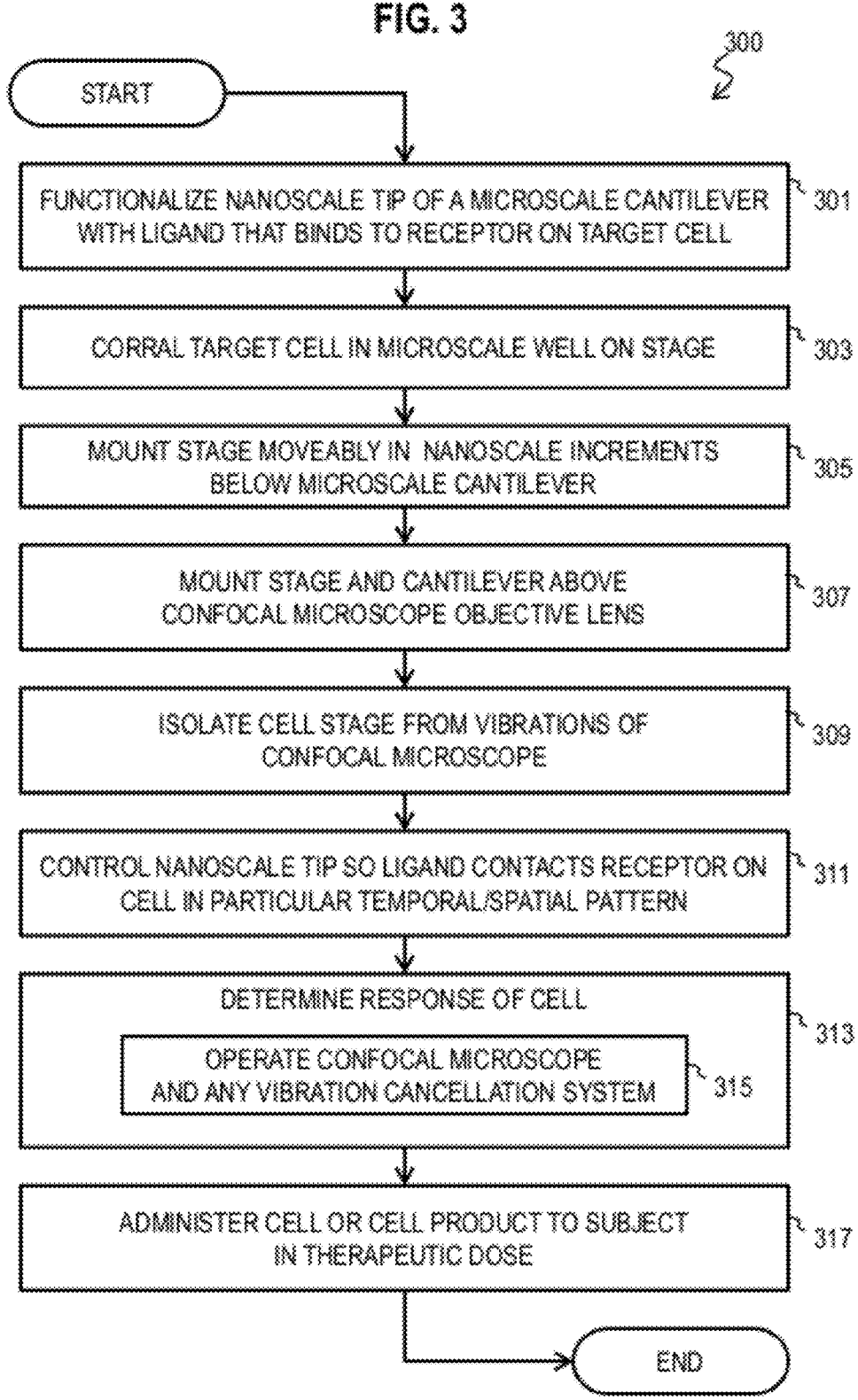

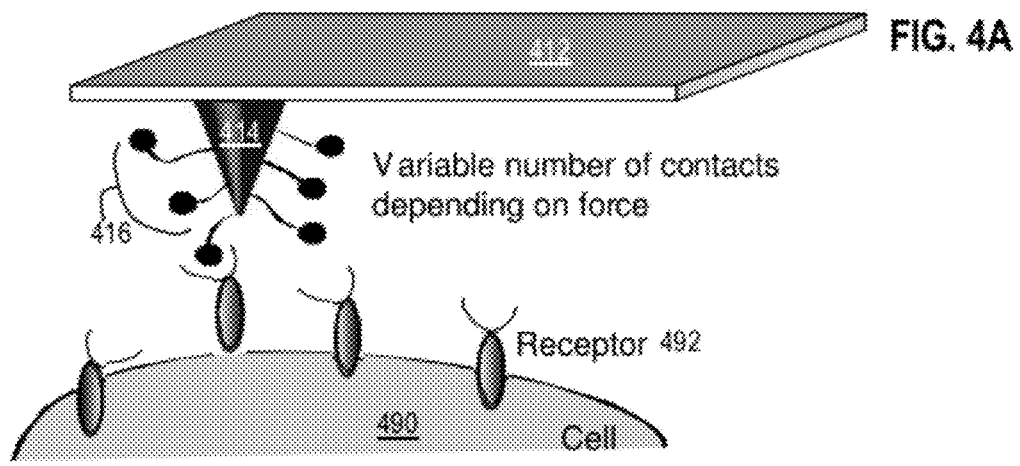
FIG. 4A
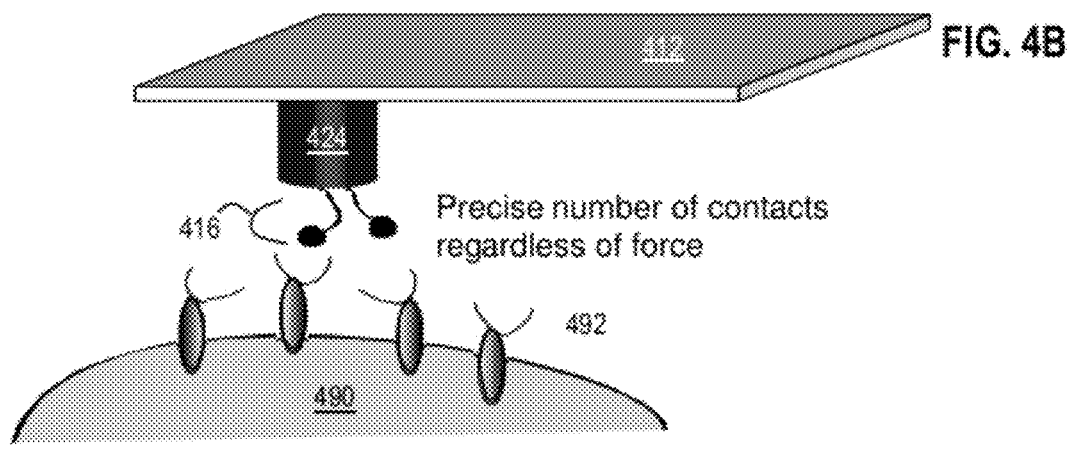
FIG. 4B
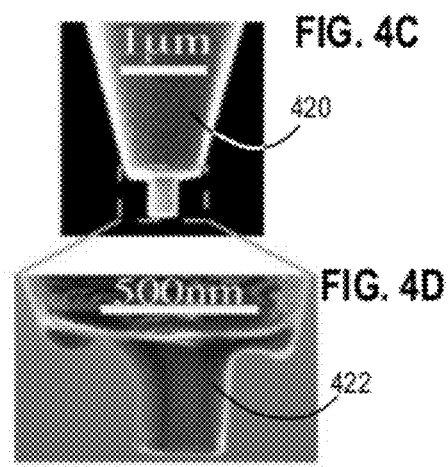
FIG. 4C
FIG. 4D

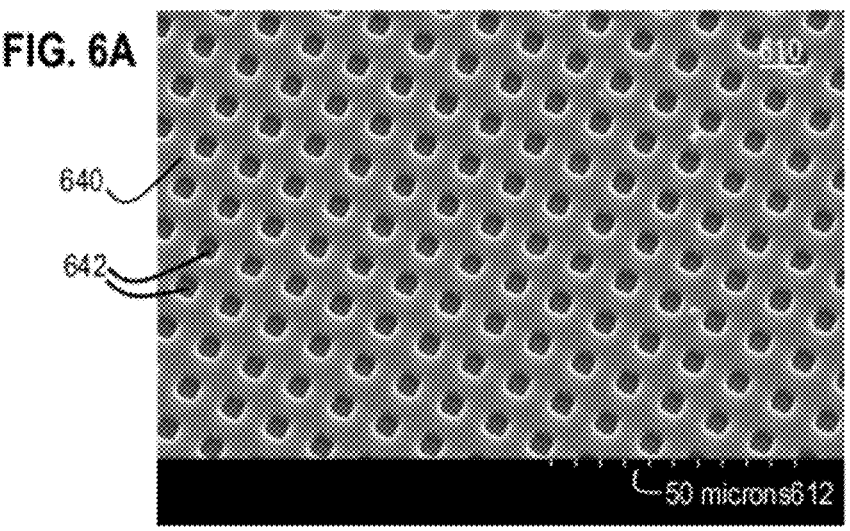
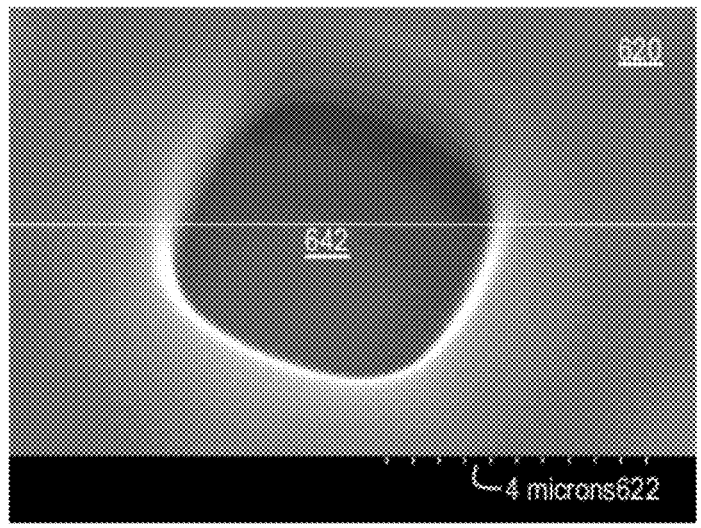
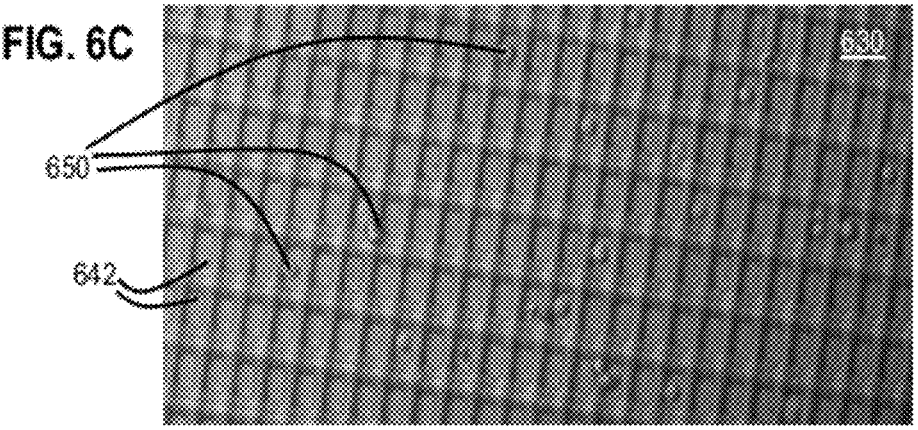

| IDENTIFIER 1210 | AMINO ACID SEQUENCE 1220 | ROLE 1230 |
|---|---|---|
| | 88　　　　　　　　　　　103 | |
| Wild type MCC peptide | A N E R A D L I A Y L K Q A T K | Agonist |
| 102S | - - - - - - - - - - - - - S - | Partial agonist |
| 102G | - - - - - - - - - - - - - G - | Antagonist |
| 99R | - - - - - - - - - - R - - - - | Antagonist |
| 93E99T102A | - - - - - E - - - - T - - A - | Neutral peptide |

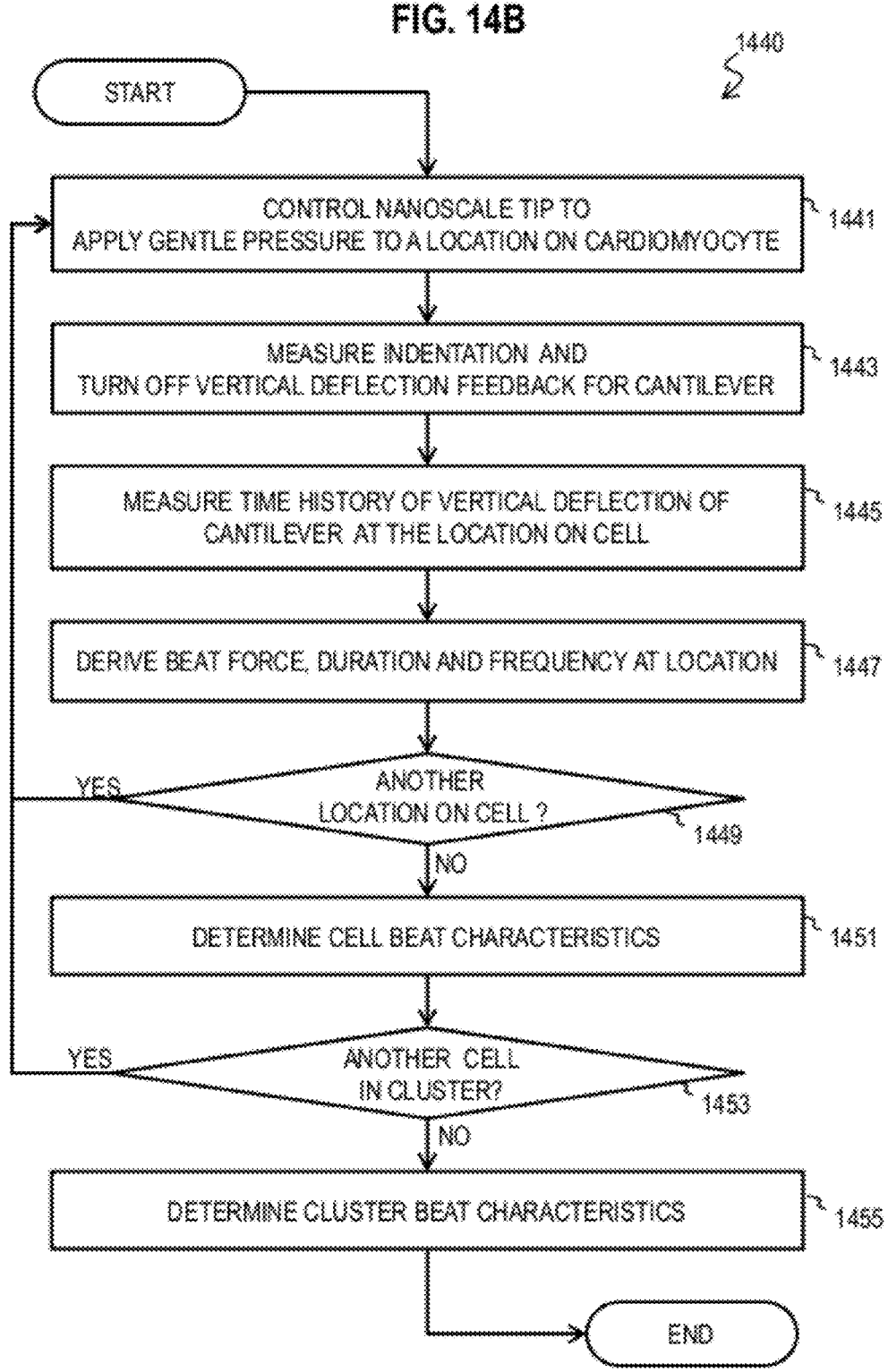

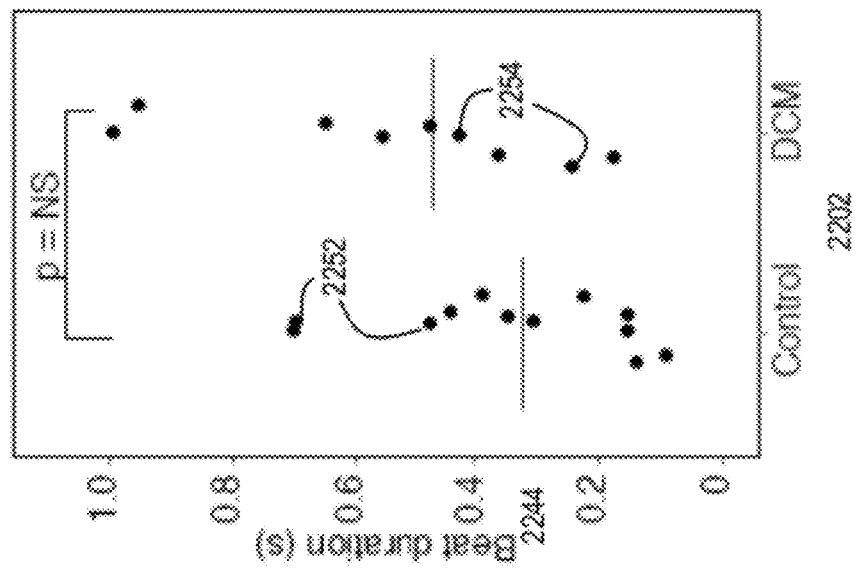
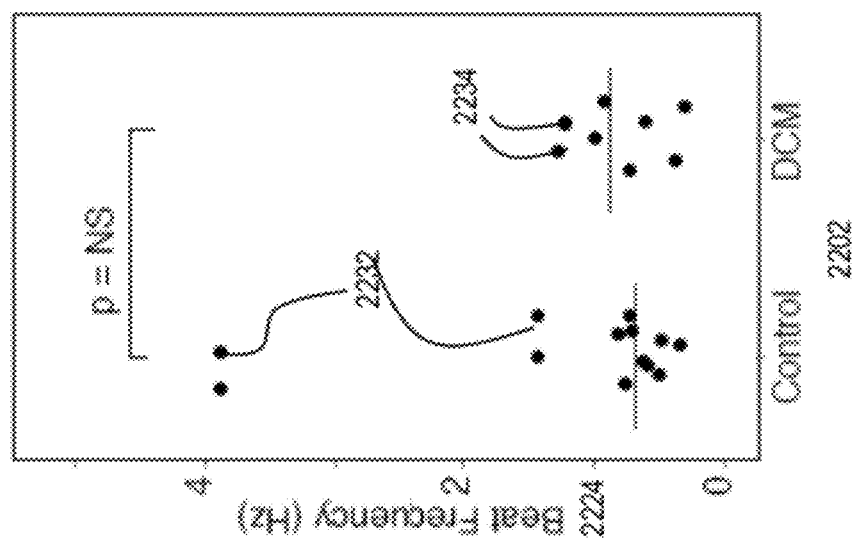
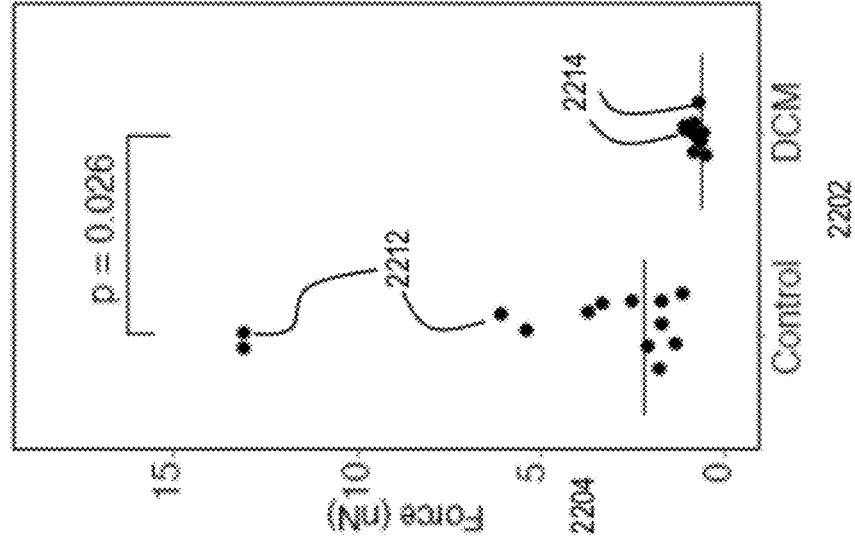

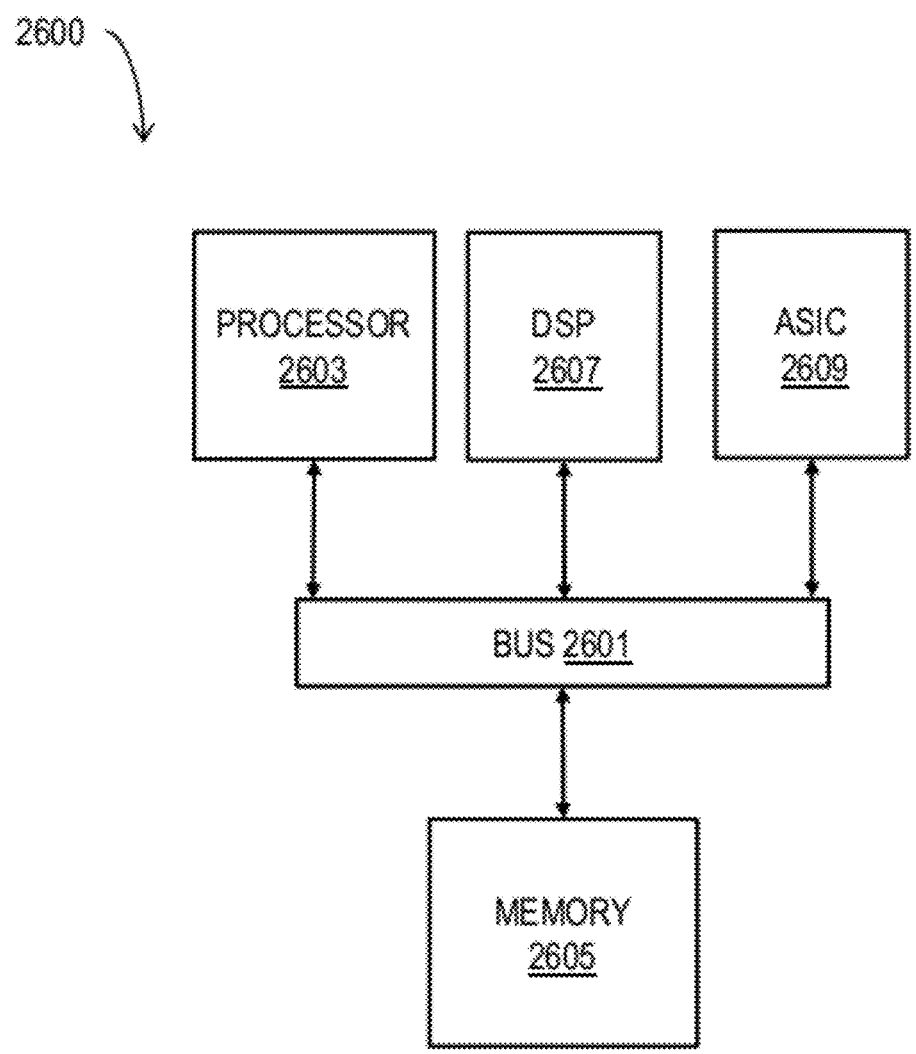

ATOMIC FORCE MICROSCOPE MANIPULATION OF LIVING CELLS

CROSS-REFERENCE TO RELATED APPLICATIONS

This application claims benefit of Provisional Appln. 61/418,013, filed Nov. 30, 2010, the entire contents of which are hereby incorporated by reference as if fully set forth herein, under 35 U.S.C. §119(e).

BACKGROUND OF THE INVENTION

Atomic force microscopy (AFM) was first described in 1986 by a group at Stanford and IBM, and quickly found application in investigating the material properties of surfaces. AFM was soon applied to biologically relevant samples, including proteins and DNA. Applications of scanning bacteria and viruses followed, and enabled topographic information to be collected at the nanoscale. Atomic force microscopy has made inroads into mammalian cell biology only in the past few years by analyzing: 1) nanomechanics, such as the mechanical stiffness of cells or their sensitivity to mechanical forces; 2) binding kinetics in force spectroscopy assays; 3) the structure of large macromolecular complexes; 4) the physical properties of biopolymers, including DNA, lipids, and proteins as they fold and unravel; and 5) receptor mapping in which molecules are localized on biological membranes.

SUMMARY OF THE INVENTION

Techniques are provided for inducing or detecting a response in a living cell by an atomic force microscope cantilever (dimensions on the order of 0.1 to $1000 \times 10^{-6}$ meters) with a nanoscale tip (dimensions on the order of 0.1 to $1000 \times 10^{-9}$ meters).

According to a first set of embodiments, a method comprises functionalizing a nanoscale tip of a microscale cantilever with a first ligand for a first receptor associated with a surface of a first type of cell. The method further comprises, controlling the cantilever to cause the first ligand on the nanoscale tip to contact the first receptor on a surface of a living cell of the first type in a particular temporal pattern to induce a target response by the living cell.

According to another set of embodiments, a method includes mounting a living cardiomyocyte on a stage of a microscale cantilever with a nanoscale tip. A controller for the microscale cantilever is operated to cause the nanoscale tip to contact the cardiomyocyte at a predetermined pressure. After turning off vertical deflection feedback, deflection data that indicates a time series of nanoscale vertical deflections of the microscale cantilever caused by the living cardiomyocyte is collected.

In other sets of embodiments, a system, apparatus or computer readable medium carrying instructions is configured to perform one or more steps of at least one of the above methods.

According to another set of embodiments, an apparatus includes an atomic force microscope comprising a microscale cantilever on which is disposed a nanoscale tip. The apparatus also includes a stage configured to be moveably positioned relative to the nanoscale tip of the microscale cantilever in microscale steps. The apparatus further includes a confocal optical microscope. A sample on the stage is disposed in a focal plane of the confocal optical microscope.

According to another set of embodiments, an apparatus includes an atomic force microscope comprising a microscale cantilever on which is disposed a nanoscale tip. The apparatus also includes a stage configured to be moveably positioned relative to the nanoscale tip of the microscale cantilever in microscale steps. The apparatus further includes a confocal optical microscope, wherein the stage is disposed so that a sample on the stage is disposed in a focal plane of the confocal optical microscope.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a flow diagram that illustrates an example method for manipulating a living cell using an AFM cantilever, according to an embodiment;

FIG. 4A through FIG. 4D are block diagrams that illustrate example effects of shape of functionalized nanoscale tip, according to various embodiments;

FIG. 6A through FIG. 6D are micrographs that illustrate example wells to corral living cells on a stage of an AFM, according to various embodiments;

FIG. 14A and FIG. 14B are flow charts that illustrate an example method for an AFM to interact with a living cardiomyocyte, according to an embodiment;

FIG. 22A through FIG. 22C are graphs that illustrate example differences among beat force, frequency and duration, respectively, between cardiomyocytes derived from control patients and diseased patients, according to various embodiments;

FIG. 26 illustrates a chip set upon which an embodiment of the invention may be implemented.

DETAILED DESCRIPTION

Figure 1:
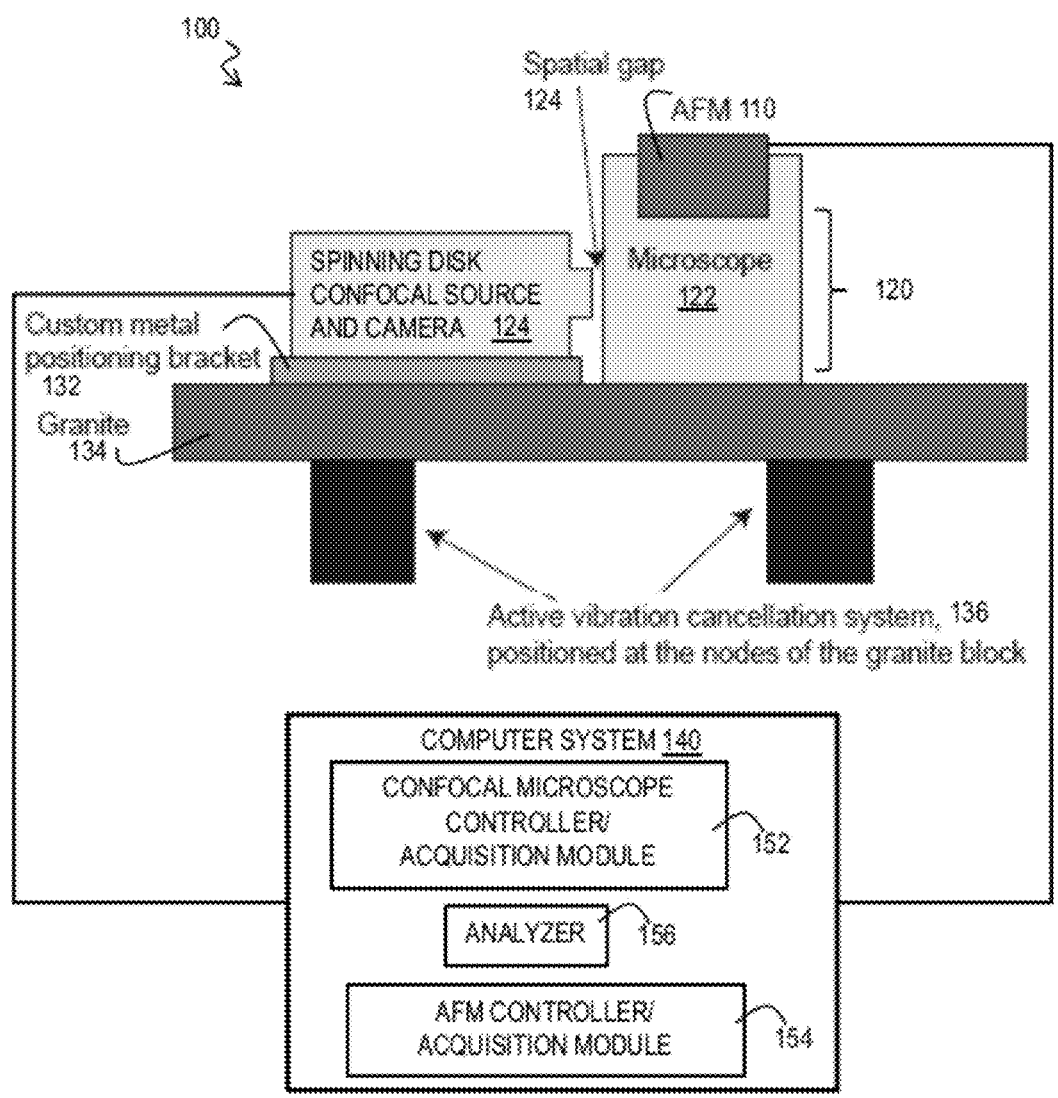
FIG. 1 is a block diagram that illustrates an example setup for observing an induced response in a living cell, according to an embodiment.

A method and apparatus are described for atomic force microscope manipulation of living cells. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

An atomic force microscope (AFM) cantilever is prepared by covalently or non-covalently attaching ligands, and then brought into contact with cells. The cantilever can also be prepared without ligands. The contact is precisely controlled with regards to force applied and duration. Intermittent contacts can be given with high frequency (up to MHz) or low frequency (minutes, hours of contact time). In some embodiments, each contact involves one or more receptors and corresponding ligands or other components of a functionalized tip. These contacts and receptor ligation events cause changes in the recipient cell. For example, it is known that stem cells differentiate under mechanical forces—this differentiation can be skewed in various embodiments.

In an example embodiment, T cells are used. It is known that T cells can be activated by receptor ligation. The duration of ligation is controlled to skew T cells towards regulatory or activated phenotypes. By ligating other T cell receptors, the differentiation of the T cells (towards different cytokine-secreting phenotypes: Th1, Th2, Th17) can be controlled. One embodiment is described in the context of inducing calcium flux as a proxy for activation in T cells. However, the invention is not limited to this context. In other embodiments the same or different response of the same or different types of living cells are induced by contacting a receptor on the cell with the same or different ligands on a nanoscale tip of an atomic force microscope.

For example, stem cells are acted upon in vitro to achieve specific differentiation patterns; T cells are acted upon in vitro to become regulatory (for transplantation or allergies or autoimmunity); T cells are acted upon in vitro to alter their differentiation (to fight infections or tumors); mast cells are acted upon to raise their threshold of activation (to reduce allergies); pathogens are acted upon to change the trajectory of infection, or to provide vaccine-type immunity; or B cells are acted upon to produce fewer antibodies (for autoimmunity) or antibodies of the "wrong" isotype, and then introduced into patients for therapeutic effects, among other applications.

In some illustrated embodiments, stem cells are differentiated into cardiomyoctes whose beat characteristics are determined by interactions with a nanoscale tip of an AFM cantilever, even without functionalization of the nanoscale tip.

In various embodiments, therapies include administering a therapeutically effective dose of cells modified by or identified by the illustrated methods, or products thereof. Any method of administration may be used in various embodiments, including introduction through any orifice, into any body lumen, or subcutaneously, or intravenously, or some combination.

Various references are cited herein, each of which is hereby incorporated by reference as if fully set forth herein, except so far as the terminology is inconsistent with the terminology used herein.

As used herein, the following terms have the meaning provided.

| | |
|---|---|
| anergy | a lack of reaction by the body's defense mechanisms to foreign substances |
| atomic force microscopy | a very high-resolution type of scanning probe microscopy, with demonstrated resolution on the order of fractions of a nanometer, more than 1000 times better than the optical diffraction limit. Information is gathered by "feeling" the surface with a mechanical probe. Piezoelectric elements that facilitate tiny but accurate and precise movements on (electronic) command enable the very precise scanning. |
| Atomic force microscope (AFM) | A device configured to perform atomic force microscopy |
| Cardiomyocyte (CM) | A cardiac muscle cell that beats without external stimulation |
| chronotrope | An agent that alters the rate of cardiac muscle contractions (positive increase rate, negative decreases rate) |
| confocal microscopy | an optical imaging technique used to increase optical resolution and contrast of a micrograph by using point illumination and a spatial pinhole to eliminate out-of-focus light in specimens that are thicker than the focal plane |
| force spectroscopy | a set of observed times to escape a bond for a corresponding set of applied forces. |
| Human embryonic stem cell (hESC) | a type of pluripotent stem cell found naturally in a human embryo |
| Induced Pluripotent stem cell (iPSC) | a type of pluripotent stem cell artificially derived from a non-pluripotent cell, typically an adult somatic cell, by inducing a "forced" expression of specific genes |
| inotrope | An agent that alters the force/energy of muscular contractions |
| ligand | a biologically important reagent that interacts with living cells, such as molecules like p-MHC and antibodies, and including lipid micelles, viruses, bacteria, small molecules, and even whole cells. |
| microscale | a maximum dimension in the range from about 0.1 to about 1000 micrometers, μm (also called microns, 1 μm = $10^{-6}$ meters) |
| nanoscale | a maximum dimension in the range from about 0.1 to about 1000 nanometers, nm (1 nm = $10^{-9}$ meters) |
| off rate | The rate at which bonds release due to kinetic motions of the bound objects. |
| PDMS | poly-dimethylsiloxan |
| Pluripotent stem cell (PSC) | a stem cell that has the potential to differentiate into any of the three germ layers: endoderm (interior stomach lining, gastrointestinal tract, the lungs), mesoderm (muscle, bone, blood, urogenital), or ectoderm (epidermal tissues and nervous system |
| T cell | thymus produced cells that belong to a group of white blood cells known as lymphocytes, and play a central role in cell-mediated adaptive immunity. |
| Treg ($T_{reg}$) | a specialized subpopulation of T cells that act to suppress activation of the immune system and thereby maintain immune system homeostasis and tolerance to self-antigens |

1. Structural Components

FIG. 1 is a block diagram that illustrates an example setup 100 for inducing and observing an induced response in a living cell, according to an embodiment. The system includes an atomic force microscope (AFM) 110, and a confocal microscope 120 comprising microscope optics 122 and confocal light source and detector, such as spinning disk confocal source and camera 124. In various embodiments, a light source for the microscope in component 124 is a halogen light, a light emitting diode, or laser, or some combination. A Nipkow spinning disk provides a set of rotating pinholes for rapidly scanning a viewing area with confocal incident and sample emitted light. Thus, in some embodiments, an apparatus includes a confocal optical microscope.

In other embodiments, e.g., in measuring beat characteristics of cardiomyocytes described in more detail below, the tip is not functionalized with ligands. In such embodiments, a novel apparatus still includes the AFM, stage for the AFM and confocal microscope. Thus, in some embodiments, an apparatus includes an atomic force microscope comprising a microscale cantilever on which is disposed a nanoscale tip. The apparatus of such embodiments also includes a stage configured to be moveably positioned relative to the nanoscale tip of the microscale cantilever in microscale steps. The apparatus also includes a confocal optical microscope, wherein the stage is disposed so that a sample on the stage is disposed in a focal plane of the confocal optical microscope.

To successfully assemble this instrument, the vibrational energy from continuous rotation of a Nipkow spinning disk in source and camera 124, which would ruin the sensitive measurements of the AFM, presented a challenge that had to be overcome. This problem was solved using both passive vibration control (granite slab 134) and active noise cancellation system 136 (e.g., sensing vibration and producing countervailing nullifying vibrations at nodes of the granite block). According to some vendors, this combination is a one-of-a-kind-in-the-world tool, and provides the capability to do simultaneous, high-resolution, fluorescent imaging of live cells in conjunction with molecular manipulation via the AFM. Thus, in some embodiments, an apparatus includes a confocal microscope wherein the confocal optical microscope is a spinning disk confocal optical microscope and the apparatus further comprises an acoustical isolation component between a stage for the AFM and a spinning disk of the spinning disk confocal optical microscope. In some of these embodiments, the acoustical isolation component further comprises at least one of a massive slab or an active vibration cancellation system The illustrated embodiment includes a custom metal positioning jacket 132 that attaches the source and camera 124 to the granite slab 134 and leaves a spatial gap 124 to avoid transferring vibrations to the microscope optics 122 and thence to the AFM 110. The spacing was manipulated to prevent the spinning disk from touching the microscope. AFM-microscope coupling is per manufacturer.

A computer system 140, such as a system comprising one or more networked computers as described below with reference to FIG. 25, or one or more chip sets in or attached to each component, as described below with reference to FIG. 26, is used to control and collect data from one or both of the confocal microscope 120 and the AFM 110 or to analyze data therefrom, or some combination. In the illustrated embodiment, the computer system 140 includes a confocal microscope controller and acquisition module 152 to control the confocal microscope 120 and collect data from it, and an AFM controller and acquisition module 154 to control the AFM 110 and collect data from it, and an analyzer 156 to process data from one or both of modules 152 and 154. Although computer system 140 is depicted as having a wired connection to the microscope 120 and AFM 110, in other embodiments one or more of these connections are wireless. Thus, in some embodiments, a computer readable medium carries instructions that cause an apparatus to control the cantilever to cause the first ligand on the nanoscale tip to contact the first receptor on a surface of a living cell of the first type in a particular temporal pattern to induce a desired response by the living cell.

Figure 2A:
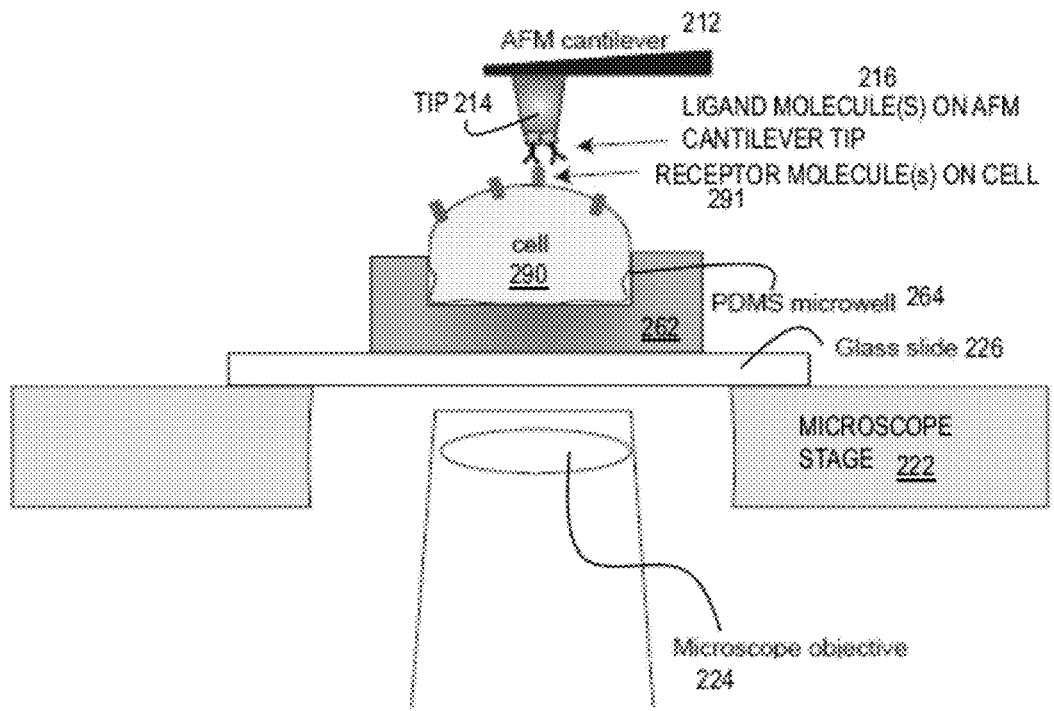
FIG. 2A is a block diagram that illustrates an example operation of the AFM cantilever with functionalized tip on a corralled living cell in view of a confocal microscope, according to an embodiment.

FIG. 2A is a block diagram that illustrates operation of the AFM cantilever 212 on a corralled living cell 290 in view of a confocal microscope, according to an embodiment. In the illustrated embodiment, a transparent glass slide 226 rests on microscope stage 222 in view of a microscope objective lens 224 of microscope optics 122. The glass slide supports an at-least-translucent, sample stage for the AFM, such as transparent poly-dimethylsiloxane (PDMS) stage 262. In some embodiments, the glass slide 226 serves as the AFM stage; and, in some embodiments, the glass slide 226 is omitted so that the at-least-translucent stage rests directly on the microscope stage 222 In other embodiments, other suitably transparent or translucent materials are used as AFM stage or stage support. In experimental embodiments, the AFM sits on a stage, held tightly in position because its three legs are placed into three holes in the stage. That AFM stage allows the specimen (glass slide bearing cells) to be positioned just underneath the cantilever. It does so by having a region in the center of the AFM stage for the glass slide to sit and be held in place with little permanent magnets placed on top of the slide that are attracted to permanent magnets embedded in the stage. The AFM stage itself can be moved in two horizontal (X,Y) directions by screws and the specimen itself can also be moved, relative to the stage, using XY piezo motors built into the AFM stage. In the illustrated embodiment, the stage 262 includes one or more microscopic scale wells (called microwells hereinafter) to corral living cells that might otherwise move autonomously. In other embodiments the microwells 264 are omitted. In the illustrated embodiment, the AFM cantilever 212 includes a nanoscale tip 214 functionalized by one or more ligand molecules 216. Thus, in some embodiments, an apparatus comprises an atomic force microscope comprising a microscale cantilever on which is disposed a nanoscale tip functionalized with a first ligand for a first receptor associated with a surface of a first type of cell. The apparatus also includes a stage comprising a microscale well for corralling a living cell of the first type. The stage can be positioned relative to the functionalized tip of the microscale cantilever. In embodiments with a confocal microscope, the stage of the AFM is disposed in a focal plane of the confocal optical microscope.

The AFM cantilever with the functionalized tip, and the device to observe the induced effect in some embodiments that include such a device, like the confocal microscope, are controlled by a computing system 140 using any technology known in the art.

Figure 2B:
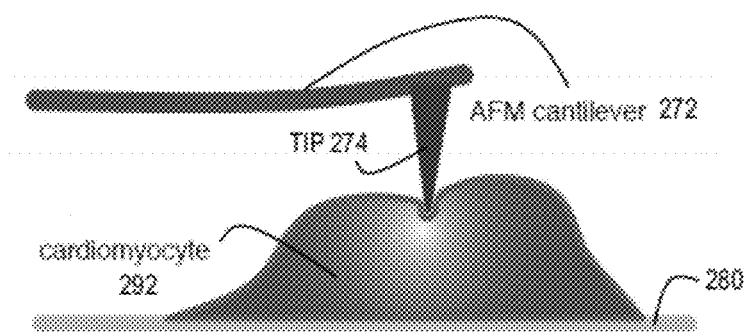
FIG. 2B is a block diagram that illustrates an example operation of the AFM cantilever on a cardiomyocyte, according to an embodiment.

FIG. 2B is a block diagram that illustrates an example operation of the AFM cantilever 272 on a cardiomyocyte 292, according to an embodiment. In this embodiment, the beat characteristics of a living cardiomyocytes are determined, and the effects of various formation and treatment plans are compared to select optimal treatment. In this embodiment, the AFM cantilever 272 is manipulated so that the tip 274 indents the cardiomyocyte 292 attached to an AFM stage 280. The tip 274 need not be functionalized with any ligands. Then the vertical fluctuations are tracked to determine beat characteristics. By deriving cardiomyocytes from different types of stem cells and subjecting the cardiomyocytes to different treatments, the viability of different sources of cardiomyocytes and treatments for cardiac patients can be assessed, as described in more detail in a later section.

In some embodiments, the favored treatments or stem cell-derived-cardiomyocytes, or some combination, are administered to a patient in a therapeutic dose to treat some cardiac ailment, such as cardiomyopathy.

2. Changing a Living Cell

In a first set of embodiments, techniques include functionalizing a nanoscale tip of a microscale cantilever with a first ligand for a first receptor associated with a surface of a first type of cell. The cantilever is controlled to cause the first ligand on the nanoscale tip to contact the first receptor on a surface of a living cell of the first type in a particular temporal pattern selected to induce a target response by the living cell.

2.1 Method

FIG. 3 is a flow diagram 300 that illustrates an example method for manipulating a living cell using an AFM cantilever, according to an embodiment. Although steps are shown in FIG. 3, and later flow diagrams FIG. 14A and FIG. 14B, as integral blocks in a particular order for purposes of illustration, in other embodiments, one or more steps or portions thereof are performed in a different order, or overlapping in time as performed in series or parallel, or are omitted, or one or more additional steps are added.

In step 301, a nanoscale tip on a microscale cantilever is functionalized by attaching, to the tip, a ligand that binds to a target receptor on a target type of cell. For example, ligand molecules 216 are attached to tip 214 on AFM cantilever 212. Any method may be used to make the attachment. Coupling biomolecules to the tip of an AFM cantilever presents two major challenges. First, coupling of the molecules is preferably either covalent or has a binding affinity vastly greater than the affinities being tested in a binding experiment. Second, the traditional pyramidal geometry of an AFM tip makes the number of molecules presented variable based on the degree of cellular contact.

In an illustrated embodiment streptavidin is coupled to Au-coated cantilevers using direct chemisorption (see, for example, Ebner A, Wildling L, et al. "Functionalization of probe tips and supports for single-molecule recognition force Microscopy," *Stm and Afm Studies On*. Berlin: Springer-Verlag Berlin; 2008. p. 29-76). Au-coated cantilevers (from MIKROMASCH™ of San Jose, Calif. or Olympus cantilevers from ATOMIC FORCE™ of Mannheim, Germany, spring constant<0.1 N/m) were treated for one minute in oxygen plasma to remove organics and to activate surface binding. The cantilever was mounted on a small block of poly-dimethylsiloxane (PDMS) for stability. Streptavidin (10 µg/mL) was pipetted directly onto the cantilever and allowed to equilibrate at 4° C. overnight. After rinsing in phosphate buffered saline (PBS), biotinylated antibody (10 µg/mL) was pipetted atop the cantilever and allowed to equilibrate at room temperature for 10 minutes, then washed with PBS extensively before use. Verification that the conjugation worked was provided by testing the functional capability of the antibodies on the cantilever tip to ligate cell-surface receptors and to do force spectroscopy in embodiments described below. Biotin-streptavidin interactions have been used in many instances for coupling molecules onto cantilevers. Thus any of multiple ligands can be bound to the streptavidin attached to the nanoscale tip. Therefore, some embodiments include functionalizing a nanoscale tip of a microscale cantilever with a first ligand for a first receptor associated with a surface of a first type of cell.

One concern has been that pyramidal tips present a variable number of molecules/contacts to a cell depending on the force applied. This problem makes measurements of affinities and kinetics difficult, because of the confounding effect of multivalent interactions between the tip and the cell-surface receptors. In some embodiments, a functionalized nanoscale tip (also called nanoprobe, herein) is used with a flat cantilever tip that presents a fixed number of contacts regardless of force. FIG. 4A through FIG. 4D are block diagrams that illustrate example effects of shape of functionalized nanoscale tip, according to various embodiments. FIG. 4A depicts a microscale cantilever 412 with a nanoscale pyramidal tip 414 functionalized with biomolecules 416. As downward force is applied to cantilever 412 a variable number of the biomolecules 416 are presented to receptors 492 on cell 490. FIG. 4B depicts a microscale cantilever 412 with a nanoscale flat tip 424 functionalized with biomolecules 416. As downward force is applied to cantilever 412 all of the biomolecules 416 on tip 424 are presented to receptors 492 on cell 490, the number of which remain fixed no matter what additional force is applied. Thus, some embodiments use specially designed nanoprobes for biological applications, such as this nanopillar tip designed by the Melosh Group at Stanford University and subsequently modified. FIG. 4C is a micrograph that depicts an upper tip 420 with a nanoscale pillar disposed below. FIG. 4D is a micrograph that depicts a close up view of the nanoscale pillar 422 with flat contact surface below. To product this configuration, a microscale tip is mounted within a focused ion beam instrument. The tip is scanned by scanning electron microscopy (SEM), which is part of the focused ion beam machine. Using the SEM image, gallium ions are directed to sculpt the tip. The gallium beam simply carves away the silicon of the cantilever. The technique has been published extensively.

Returning to FIG. 3, in step 303, a target cell is corralled in a microscale well on a stage of the AFM. In some embodiments in which the target cell type is not motile, step 303 is replaced with a step to mount a cell of the target type on a different stage, as described below with reference to FIG. 14.

Many target cell types are motile, and can crawl away from an AFM cantilever during an experiment. This motility was evident during pilot studies with AFM and T cells of the mammalian immune system, wherein the T cells crawled away from under the cantilever tip. Immune cells such as T cells use this motility (about 10 microns per minute) to access sites of infection or inflammation, or while trafficking within the lymph nodes to seek antigenic stimulation. Trying to affix cells to a surface by applying integrin ligands such as fibronectin or laminin, or charged polymers such as poly-lysine, can partially activate the cells, which may interfere with the purpose of an experiment. To prevent motile cells from crawling away during AFM interrogation, a method was devised to corral the cells by fabricating shallow microwells using PDMS.

Figure 5:
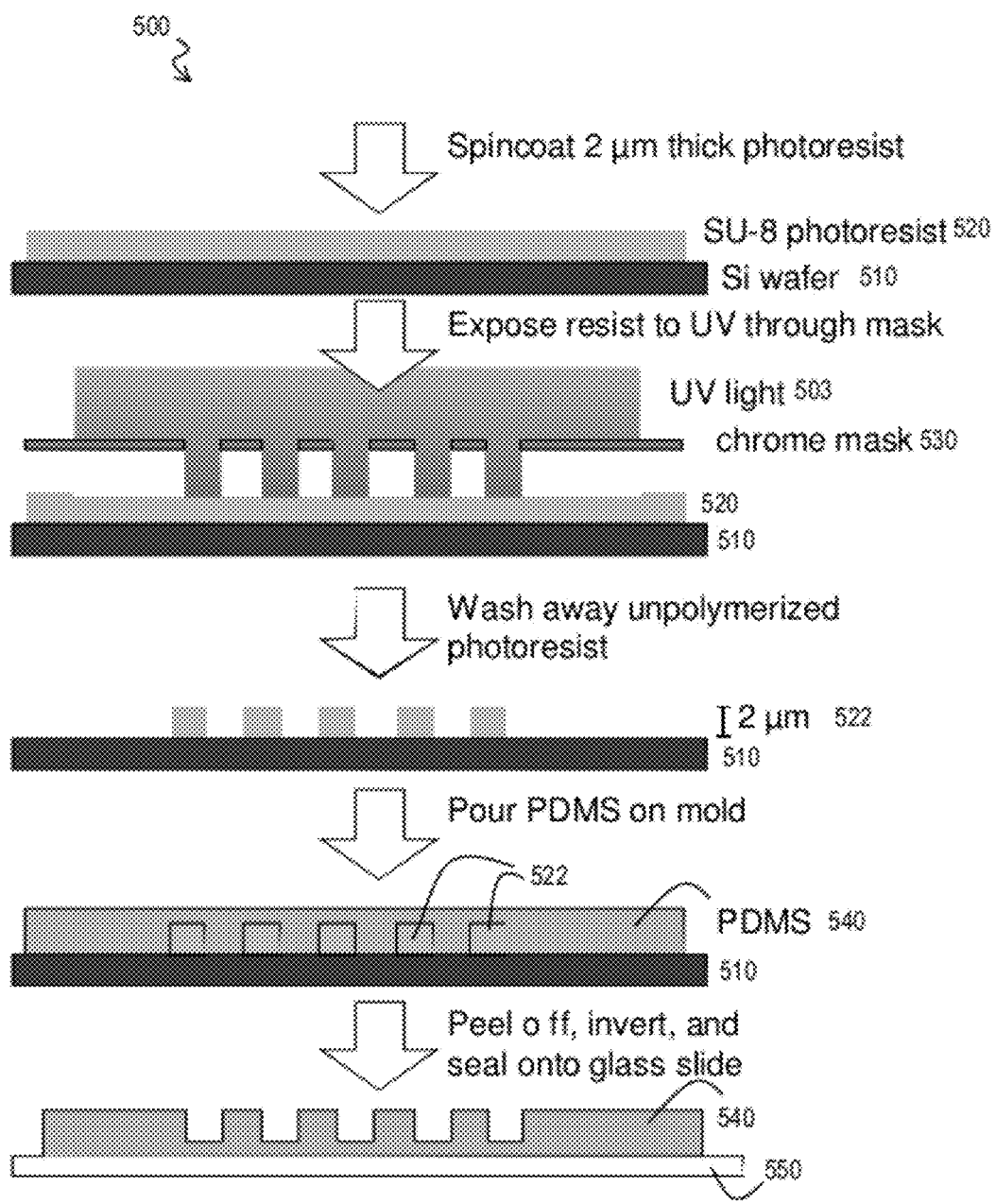
FIG. 5 is a block diagram that illustrates example intermediate stages in the production of wells to corral living cells on a stage of an AFM, according to an embodiment.

In an experimental embodiment, 2 µm deep, 5 µm×5 µm wells were fabricated using soft lithographic techniques. FIG. 5 is a block diagram that illustrates example intermediate stages in the production of wells to corral living cells on a stage of an AFM, according to an embodiment. A SU-8 photo resist was spin coated to about 2 to 3 microns thick layer 520 on a silicon wafer 510. A chrome mask 530 was positioned above the photoresist layer 520 and the assembly was exposed to ultraviolet (UV) light 503 to polymerize the exposed photoresist. The chrome mask 530 was removed and the un-polymerized photoresist was washed away, leaving a patterned polymerized photoresist layer 522, 2-3 microns thick, to serve as a mold on the silicon wafer 510. Liquid PDMS was poured over the mold to form a PDMS layer 540 with a thickness of greater than 2 microns. When set, the PDMS layer 540 is peeled off the mold and attached, well side up to a transparent substrate support 550, such as glass.

Figure 6D:
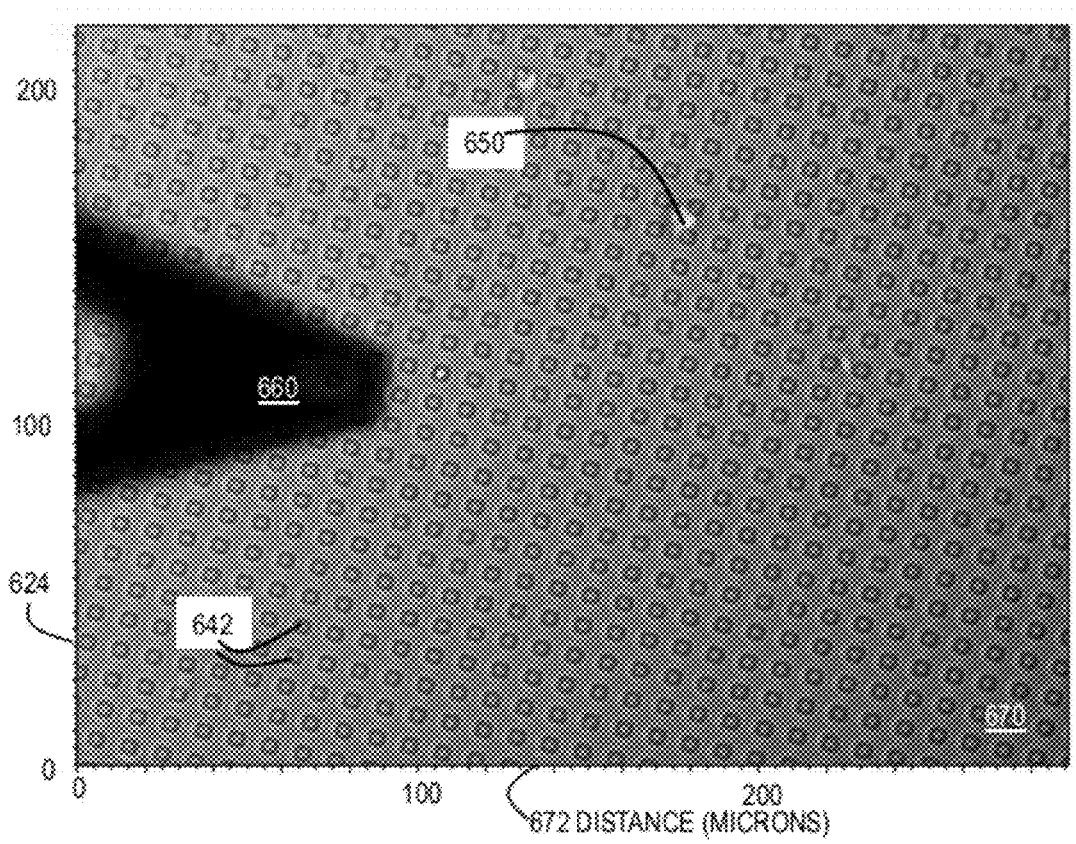

FIG. 6A through FIG. 6D are micrographs that illustrate example wells to corral living cells on a stage of an AFM, according to various embodiments. FIG. 6A is a scanning electron microscope (SEM) image 610 with horizontal and vertical scales given by tick marks 612 indicating 50 microns. The micrograph 610 depicts a PDMS stage 640 for an AFM with an array of microwells 642. FIG. 6B is a scanning electron microscope (SEM) image 620 with horizontal and vertical scales given by tick marks 622 indicating 4 microns. The micrograph 620 depicts a single microwell 642. FIG. 6C is a confocal microscope image 630 that depicts an array of microwells 642 with individual T cells 650 corralled in several microwells. FIG. 6D is a total internal reflection (TIRF) microscopy bright field image 670 taken through a confocal microscope. The horizontal axis 672 and vertical axis 674 indicate distance in microns. Micrograph 670 depicts the array of microwells 642 as well as T cells 650, including a T cell (image blocked) while the T cell is being interrogated by a tip of an AFM cantilever 660.

During step 303, cells of the target type are pippetted onto the stage with microwells. For example, in an experimental embodiment, primary mouse CD4 T cells were disposed by pipette over the top of the wells and were allowed to settle at 37° C. for 30 minutes. These were imaged, such as depicted in FIG. 6C. Experiments described in more detail below confirmed that cells were still functional when corralled in such microwells. For example, a T cell that was restrained from crawling away by a microwell was able to be interrogated by AFM for 20 to 30 minutes. Thus, in some embodiments, a method further comprises corralling the living cell in a microscale well.

It is also a challenge to keep cells alive on the AFM stage for such manipulation. A number of difficult challenges arise when using AFM with living cells. First, the cells require a warm and nutrient-rich environment. Use of a submersible heating element keeps the cells warm, but can create thermal currents that affect the deflection of the AFM cantilever. In various embodiments, this challenge is addressed by 1) allowing the cantilever to equilibrate in warm media for about 30 to about 60 minutes before work, and 2) by developing AFM cantilevers that are metal coated on both sides, so as to decrease the effects of asymmetric thermal expansion.

Returning to FIG. 3, in step 305 the AFM stage is mounted below the microscale cantilever so that the stage and cantilever can move relative to each other in nanoscale increments.

Either the cantilever or the stage, or both, move relative to a laboratory frame of reference. Such incremental movement is routine for many currently available AFMs known in the art. The nanoscale increments allow the nanoscale tip to be positioned to contact particular receptors on a cell membrane of a cell affixed to the stage, such as a living cell disposed within a microwell.

The scan rates of widely available AFMs are from about 0.1 Hz to about 1 Hz. Scan rate in Hz represents the time to scan one line of the desired area. The desired area may be divided up into some number of pixels in X and Y. The AFM piezo stage will then scan the desired area. Scan rate tells how fast it can scan once across X. Such scan rates consume minutes to scan a cell-sized area, during which time a cell can change significantly. Thus, cells should be kept alive and functioning for such time scales after mounting. This last issue is less of a concern for some embodiments in which faster scanning is not involved.

In some embodiments, the AFM stage is mounted in the focal plane of a confocal microscope system, such as confocal microscope 120. In such embodiments, the method 300 of FIG. 3 includes steps 307 or step 308, or both. For example, in embodiments that determine the response of a cell to manipulation by the AFM, fluorescent molecular probes are often used, which probes are detected by the confocal microscope system or some other microscope system.

In step 307, the AFM stage and cantilever with functionalized tip are mounted above the objective lens of a confocal microscope, such a confocal microscope 120. If the confocal microscope has a source of vibration, e.g., spinning Nipkow disc, which would affect the motion and operation of the AFM, then, in step 309, the cell stage is isolated from these vibrations. For example, the spinning disk portion 124 is placed separately on a granite slab 134 with a spatial gap 124; and, any active vibrational controls 136 are turned on.

In step 311, the nanoscale tip is controlled so that a ligand of the functionalized tip contacts a receptor on the cell in a particular temporal/spatial pattern. For example, a ligand on the functionalized tip interacts with one or more receptors on living cells in a single-ligand-on-single-receptor fashion with precise on-off control. This use of AFM to ligate receptors on live cells with spatiotemporal control is an innovation that has the potential to expand knowledge of the function of receptors on immune cells and eventually provide the capability to "program" the differentiation pathways of T cells, stem cells, or other cells ex vivo, for cellular therapy or for fundamental studies. This step delivers ligands to cell-surface receptors, to activate these receptors in a temporally- and spatially-precise way, and to either affect or determine the downstream biology of single receptor ligation, or both. With respect to target T-cell types, this novel approach is expected to give new quantitative and qualitative understanding of T-cell activation, and also yield new therapeutic strategies to shape T-cell responses in cancer, autoimmunity, transplantation, allergy, and infection. Thus, in some embodiments, a method includes controlling the cantilever to cause the first ligand on the nanoscale tip to contact the first receptor on a surface of a living cell of the first type in a particular temporal pattern to induce a desired response by the living cell.

Figure 7:
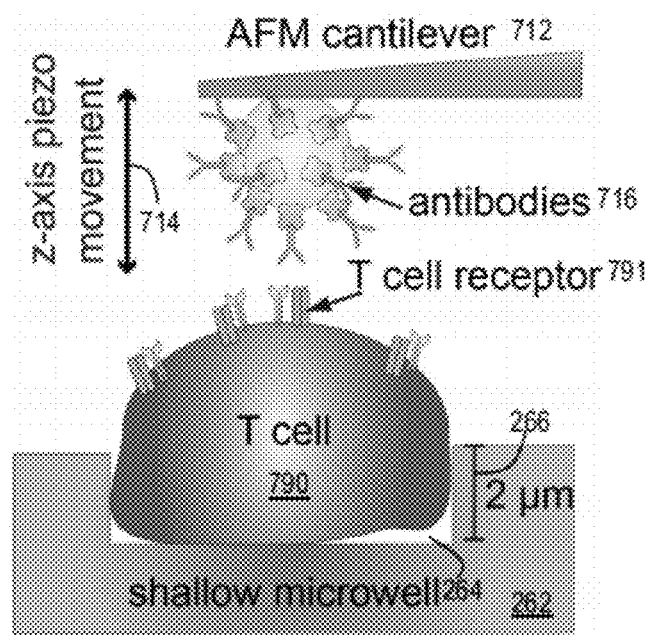
FIG. 7 is a block diagram that illustrates an example method to manipulate immune response of a T-cell of a mammalian immune system, according to an embodiment.

FIG. 7 is a block diagram that illustrates an example method to manipulate immune response of a T-cell of a mammalian immune system, according to an embodiment. AFM cantilever 712 is coupled through a functionalized tip with anti that ligate receptors 791 on a T cell 790 restrained in a microwell 264 in a stage, such as PDMS stage 262. By controlling the height through z-axis piezo m with time, the T cell receptors 791 are gently ligated and released in a temporal pattern of choice. The cantilever can then be moved horizontally to ligate gently a different receptor of the same or different type on the same cell or a different cell in a different microwell.

In some embodiments, the pattern of gentle ligation is based on force spectroscopy, which is obtained from the literature or from other AFM experiments or, in some embodiments, experiments using the same equipment. In the equilibrium between free receptor and ligand and their bound state, according to the Arrhenius model, an energy barrier must be overcome for the reaction to proceed. According to the Bell model (Bell G., *Science*.; v 200 (4342) p 618, 1978) as modified by Evans and Ritchie (Evans E, Ritchie K., *Biophys J.*; v72(4) p 1541-55, 1997. PMCID: 1184350), applying an external pulling force f to a receptor-ligand interaction exponentially lowers the transition state energy barrier and increases the dissociation rate $k_{off}(f)$ as given by Equation 1.

$$k_{off}(f) = k_{off}^0 e^{(-f\gamma/k_B T)} \quad (1)$$

where $k_{off}^0$ is the dissociation rate in the absence of a pulling force, γ is a the position of the transition state energy barrier (in Angstroms of bond separation), T is absolute temperature, and $k_B$ is Boltzmann's constant.

The AFM is capable of applying a constant loading force to the bond by retracting the cantilever tip at a rate r, giving the most probable unbinding force $f_{max}$ for the unbinding of the complex to be given by Equation 2 (Wojcikiewicz E, Abdulreda M, et al. *Biomacromolecules*, v7(11), pp 3188-95, 2006).

$$f_{max}(r) = \frac{k_B T}{\gamma} \ln\left(\frac{\gamma r}{k_{off}^0 k_B T}\right) \quad (2)$$

By measuring the unbinding force at a variety of pulling rates, the off-rate ($k_{off}$) can be derived at a range of forces, and thus the off-rate calculated in the absence of force. Nonlinear fitting of the observed forces plotted against a variety of pulling rates yields the position of the energy barrier γ distance in Angstrom. The reduction in the height of the transition state energy barrier ΔΔG(f) is then calculated from Equation 3, and depicted in FIG. 8.

$$\Delta\Delta G(f) = \Delta G^0 - \Delta G(f) = -k_B T \ln\left(\frac{k_{off}^0}{k_{off}(f)}\right) \quad (3)$$

Figure 8:
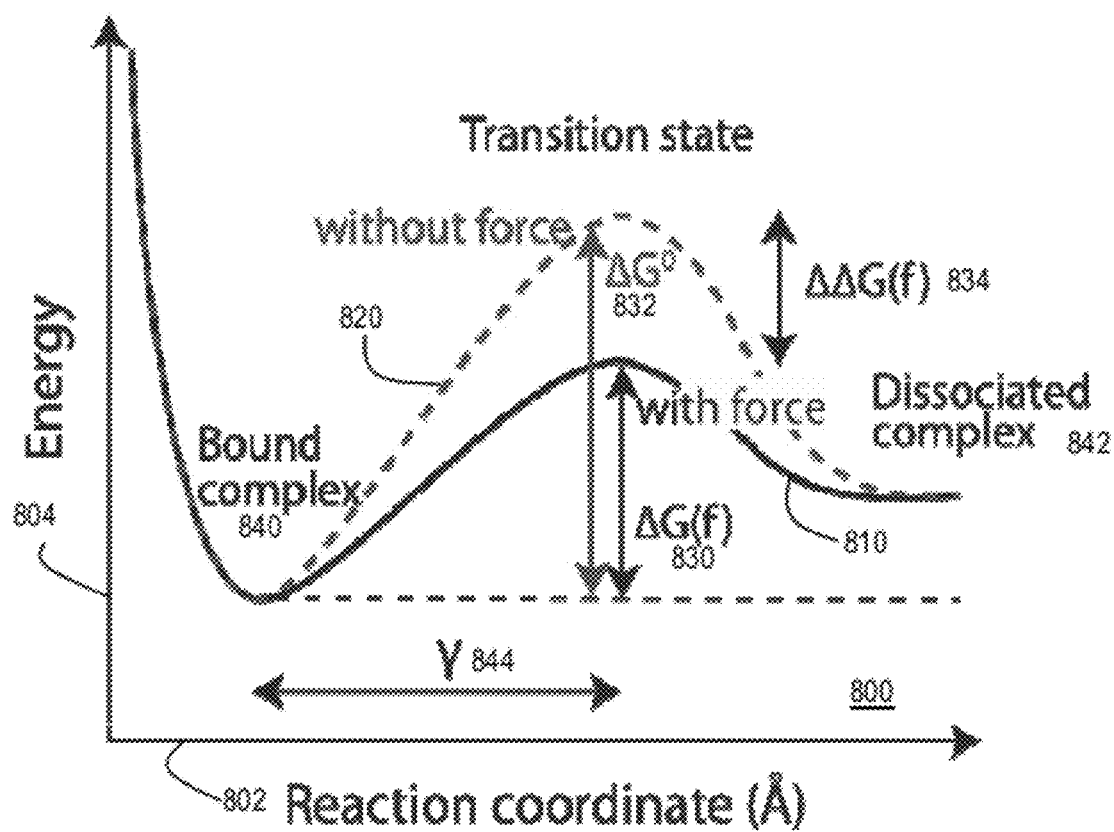
FIG. 8 is a graph that illustrates an example energy diagram that can be solved from AFM dynamic force spectroscopy, according to an embodiment.

FIG. 8 is a graph 800 that illustrates an example energy diagram that can be solved from AFM dynamic force spectroscopy, according to an embodiment. The horizontal axis 802 is reaction coordinate (related to distance between ligand and receptor) in Angstroms (Å, 1 Å=10$^{-10}$ meters). The vertical axis 804 is energy of the reacting molecules (related to absolute Temperature and rate of applying force with the AFM cantilever) in relative units. Trace 810 indicates the energy state of the two molecules at various distances with a particular force applied by the AFM as related to the off rate $k_{off}$. The trace 820 indicates the energy state of the two molecules at various distances at the limit of no force applied by the AFM which is related to $k^0_{off}$. The energy minimum associated with the binding state of the two molecules is indicated by bound complex position 840, and the energy state of the two molecules separated at distance is indicated by the dissociated complex 842. The energy barrier that must be overcome to separate the molecules is at position γ 844 and the height of the barrier is given by ΔG(f) 830 when a force is applied by the AFM and $\Delta G^0$ 832 without such a force. The decrease in energy threshold when the force f is applied is given by $\Delta\Delta G(f)$ 834, as computed using Equation 3, above.

Thus dynamic force spectroscopy can be used to calculate all aspects of receptor-ligand kinetics, but with the unique advantage of measuring kinetics on the live cell, rather than in an artificial environment. With knowledge gained by experiment of the force to apply to the cantilever to bind and dissociate any ligand to any receptor, the number, duration and rate of binding of the ligands on the functionalized tip to receptors in a cell membrane can be controlled and used to obtain or determine cell response to such stimulation.

In some embodiments, the response of the cell is determined in step 313. In some embodiments, the response is determined by performing chemical analysis or sequencing operations on the material in cells manipulated by the functionalized tip. Thus, in some embodiments, a method includes determining an effected response by the living cell.

Figure 9A:
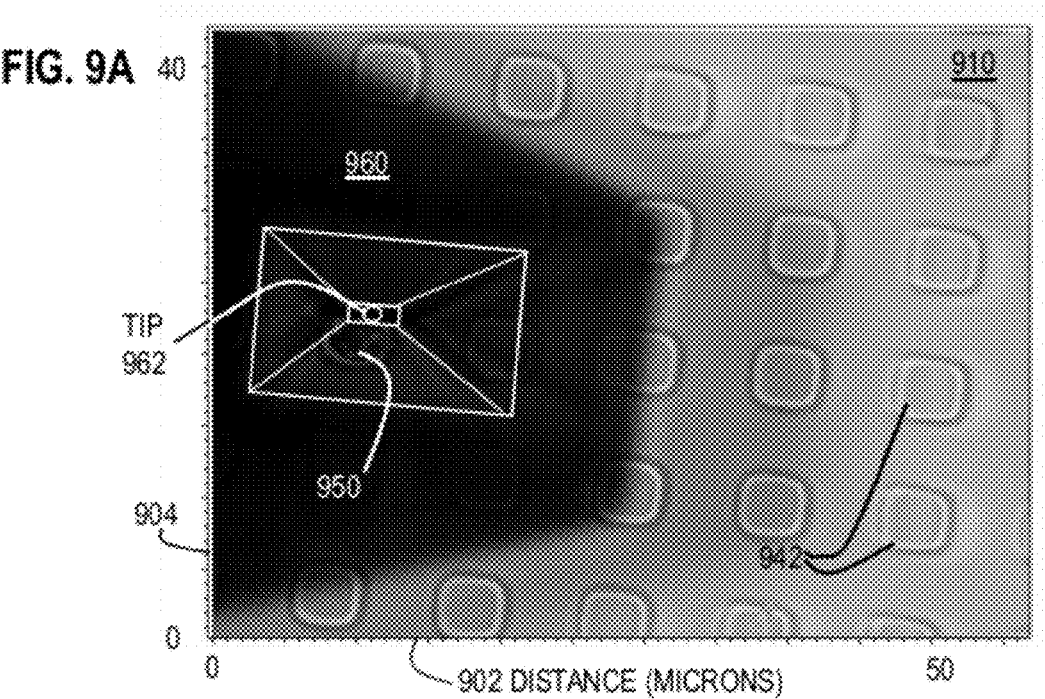
FIG. 9A and FIG. 9B are block diagram that illustrate example relation of nanoscale tips of AFM cantilevers to cells corralled in wells in a focal plane of a confocal microscope, according to various embodiments.
Figure 9B:
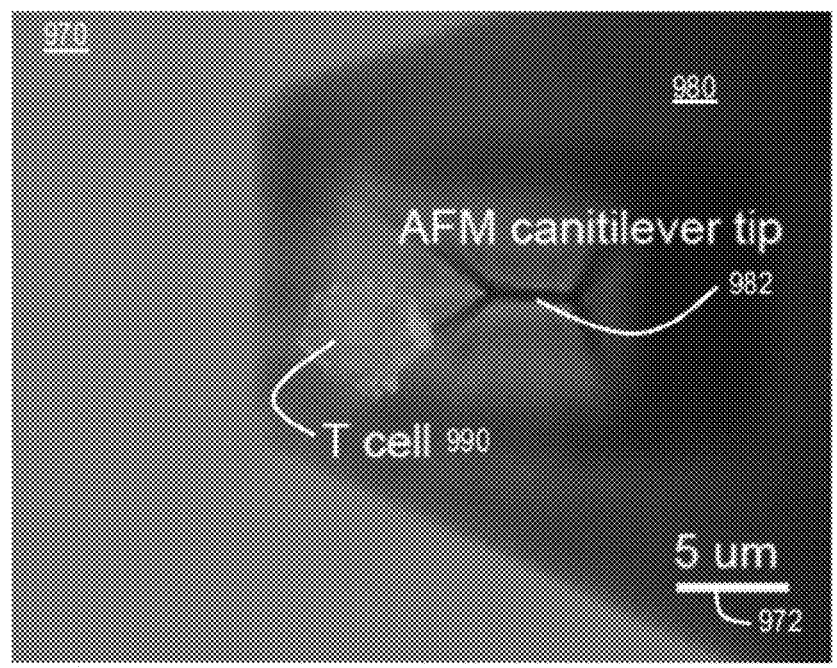

In some embodiments, the response is determined during step 313 by operating the confocal microscope and any vibrational cancellation system in step 315. For example, in some embodiments, the response is observed using a microscope, such as confocal microscope 120 in system 100, in step 315. The apparatus of FIG. 1 is especially useful in determining this response, because the cell being manipulated by the AFM is directly observable by the confocal microscope. FIG. 9A and FIG. 9B are block diagram that illustrate example relation of nanoscale tips of AFM cantilevers to cells corralled in wells in a focal plane of a confocal microscope, according to various embodiment. FIG. 9A is a combined total internal reflection (TIRF) microscopy and bright field image 910 taken through a confocal microscope with horizontal axis 902 and vertical axis 904 indicating relative distance in microns. The micrograph 910 depicts microwells 942 on an AFM stage and a microscale cantilever 960 on which is drawn an outline of the cantilever tip 962. A cell 950 corralled in a microwell is being manipulated by this tip 962. FIG. 9B is a combined bright field, confocal fluorescence, and TIRF microscopy image 970 of an AFM cantilever 980 and functionalized tip 982 next to a primary mouse T cell 990. The distance scale is indicated by horizontal bar 972. The confocal image shows fluorescence emission from the T cell 990 in a red band by calcein red-orange, which is a cytoplasmic dye, and a blue band by Hoechst, which is a nuclear DNA dye. As manipulation by the functionalized tip 982 affects the T cell 990, the fluorescent emission can be varied and observed by the confocal microscope even absent the bright field and TIRF imagery. Thus, in some embodiments, determining an effected response by the living cell further comprises operating a microscope to image the living cell. In some of these embodiments, operating the microscope to image the living cell further comprising reducing vibrations from the microscope from reaching the living cell or microscale cantilever.

In some embodiments, the response is already known from previous experiments to be a target response (e.g., acquired immune response of the T cell), and step 313 is omitted. In such embodiments, the result of step 311 is the programmed cell, e.g., the target cells derived from the "programmed" stem cell or the T-cell "programmed" for a target immune response, or an antibody produced from such a programmed T cell.

Returning to FIG. 3, in step 317, one or more cells with the proper response, e.g., a differentiated cell from a stem cell or an immune response to a particular antigen, or a product of such a cell, is administered to a subject in a therapeutic dose that interrupts or retards the progress of a disease.

The lack of in vitro tools that enable instantaneous on-and-off control of cellular receptor signaling has been a serious hindrance in developing a quantitative understanding of how cells process signals. Understanding how T cells process their receptor signals in their "decision" to become activated or tolerant may be an important question for many cell types: neurons (how transient action potentials lead over time to long term potentiation and memory), pancreatic beta cells (how brief ion channel signals accumulate to the decision to release insulin), and endothelial cells (how days of mechanical wall pressure in blood vessels alters the physiology of high blood pressure). These kinds of questions provided the impetus to develop the described novel bioengineering approach using AFM to study signal integration. Techniques in nanotechnology, including soft lithography and AFM, were involved to develop this approach, but just as important were the deep experiences in immunology, cell biology, and biophysics that allowed identification of the important, long-standing questions.

Much as the invention of optical tweezers enabled the control of molecule-laden beads or cells, and led to an explosion in single-molecule biophysics, and the invention of AFM enabled an explosion in the materials sciences, the development of the technology presented here shares three key features: i) availability; ii) multiply applicable; and iii) customizable. With regard to availability, almost half of the AFM units sold by ASYLUM RESEARCH™ of Goleta, Calif. go to biology labs, so many labs are already poised to apply these approaches to the cell types they study. With respect to multiple applications, it is shown that, not only, are these techniques applicable to three long-standing puzzles in T cell biology described next, but also these techniques apply to many kinds of cells. With regard to customizable, not only is it shown that biological molecules such as p-MHC and antibodies can be coupled to the AFM cantilever, but also attachment of other biologically important reagents to the AFM can be envisioned, including lipid micelles, viruses, bacteria, small molecules, and even whole cells. This customizability allows investigators to use biological AFM to address long-standing problems across cell biology.

2.2 Example Embodiments

Partial observations from various example embodiments were described above to illustrate the steps of method 300. Here various embodiments are described in more detail.

T cells require ligation of the antigen-specific T cell receptor (TCR) by an antigenic peptide associated with the major histocompatibility complex (abbreviated p-MHC hereinafter) to become activated. When the cell surface costimulatory receptor CD28 is also ligated at the same time as TCR, the amount of antigen needed to activate the T cell is greatly reduced and the immune response is learned. CD28 dramatically facilitates the survival and cytokine production of activated T cells, and helps shape the trajectory of differentiation to the various helper T cell subsets (Th1, Th2, Th9, Th17, etc.). The inhibitory receptor PD-1 plays an opposite role: when co-ligated along with TCR, PD-1 decreases cytokine production and arrests the cell cycle. In the presence of exogenous TGF-β, ligation of PD-1 on T cells drives the differentiation of helper T cells into regulatory T cells. T cell activation and effector behavior may be controlled by many such cell-surface receptors, including LFA-1, PD-L1, CTLA-4, NKG2D, and ICOS. How the T cell integrates dozens of contemporaneous "positive" and "negative" signals over the many hours of its myriad encounters with APCs in the lymph node is as yet unknown, and can be discovered using the techniques described here.

Ligating both TCR and costimulatory receptors on T cells with precise control by AFM enables activating antigen-specific T cells in vitro using a specific pattern of signals that enables reprogramming of the differentiation pathway, and then re-transferring back to the host. It has been shown that adoptive transfer of even a single T cell can mediate delayed type hypersensitivity in the skin and protection from infection. It is anticipated that combining AFM reprogramming and in vitro expansion creates a large number of specifically programmed cells, constituting a novel regimen of cellular therapy that could play an important role in tumor immunotherapy or in severe autoimmune disease. Furthermore, this technique can be applied to differentiate stem cells, which require both receptor signals as well as mechanical forces to shape their lineage decisions.

The affinity of the TCR for its cognate p-MHC is quite weak (low micromolar dissociation constant), mainly due to a fast off rate. The development of "altered peptide ligands", that is, peptides with amino acid substitutions of the wild-type sequence that still bind the TCR but with altered affinity (either higher or lower than wild-type), has highlighted the importance of binding kinetics of the cognate peptide for T cell activation. There have been conflicting studies through the years identifying the off-rate or the affinity as the key kinetic factor that relates to T-cell outcomes. Altered peptide ligands have been used to accelerate T-cell responses in cancer therapy, or, on the flip side, to skew T-cell differentiation pathways as a treatment for autoimmunity, or to induce T-cell anergy (unresponsiveness) or regulatory T cells. What is lacking currently is the ability to predict how a mutant peptide will affect the outcome of T-cell activation—addressing this problem is performed in some embodiments.

In experimental embodiments described here, T cells are manipulated using the AFM. Antibodies specific for the mouse T cell receptor were coupled onto a nanoscale tip of a microscale cantilever using streptavidin-biotin linkage, as described above. Thus, in some embodiments of the methods, the first type of cell is a T-cell of a mammalian immune system, and the desired response by the living cell is an immune response to the ligand. As described above, in some of these embodiments, the method further comprises administering the living cell to a subject to induce in the subject an immune response to the ligand.

2.2.1 Stimulated Ca Flux in T-cells

Helper mouse CD4 T cells were loaded with a $Ca^{2+}$-sensitive fluorescent dye (Fluo-4 available from Invitrogen, Carlsbad Calif.), plated onto the surface of the PDMS microwells, and allowed to settle. Transient, gentle contact (about 0.05 to 0.5 nanoNewtons, nN, 1 nN=$10^{-9}$ Newtons) of the functionalized AFM cantilever with the T cell revealed $Ca^{2+}$ influx within about 6 seconds of contact as compared to a nearby bystander cell, consistent with many previous studies that $Ca^{2+}$ flux is an essential and early marker of T-cell activation. Lifting the cantilever to unligate its receptor contacts revealed rapid $Ca^{2+}$ homeostasis.

Figure 10:
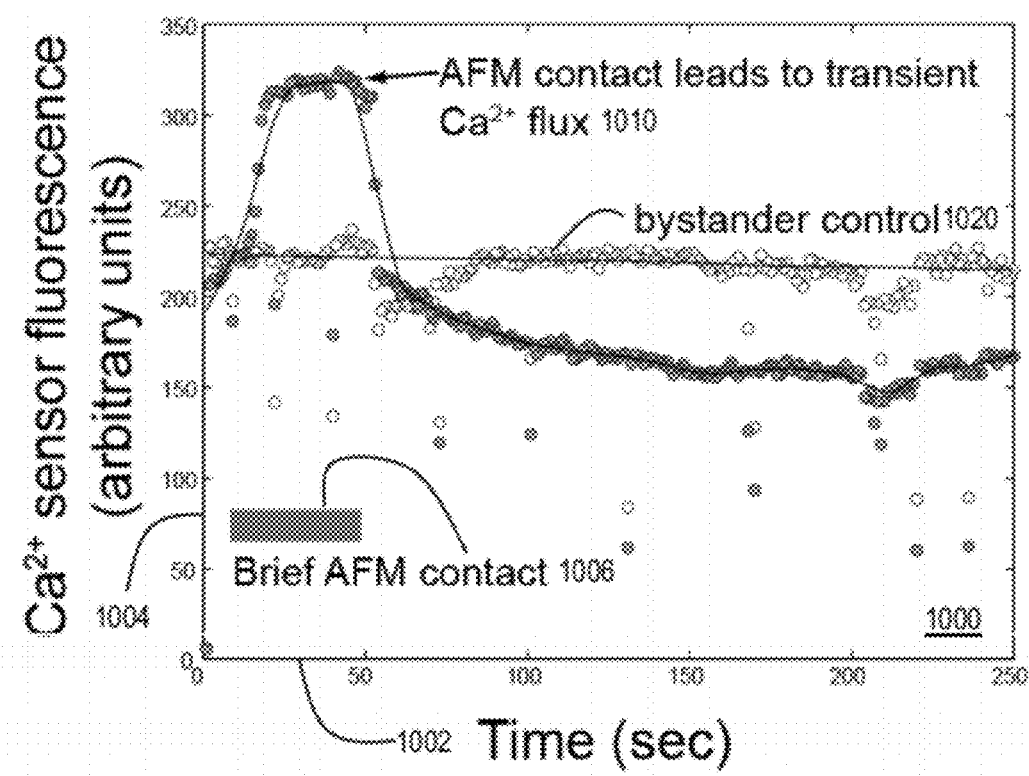
FIG. 10 is a graph that illustrates example results from manipulating a living cell with a functionalized tip of an AFM cantilever, according to an embodiment.

FIG. 10 is a graph that illustrates example results from manipulating a living cell with a functionalized tip of an AFM cantilever, according to an embodiment. The horizontal axis 1002 indicates time in seconds. The vertical axis 1004 indicates amount of fluorescence, in arbitrary units, of the $Ca^{2+}$-sensitive fluorescent dye. The time during which the AFM gently ligates the T cell is indicated by bar 1006. Points 1010 form a trace that indicates the $Ca^{2+}$ flow in a T cell that was stimulated by the functionalized tip of an AFM cantilever. Points 1020 form a trace that indicates the $Ca^{2+}$ flow in a T cell that was not stimulated by the functionalized tip of an AFM cantilever. Clearly, the $Ca^{2+}$ flux increases due to the gentle contact of the functionalized tip. Removal of the tip causes the $Ca^{2+}$ flux to drop below un stimulated levels.

2.2.2 Force Spectroscopy on T-cells

Figure 11A:
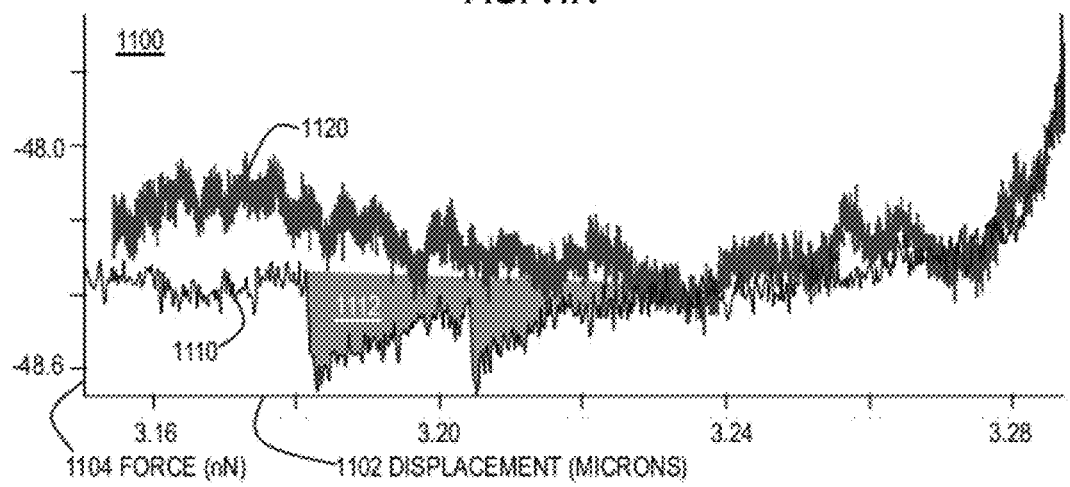
FIG. 11A is a graph that illustrates example force curves of p-MHC on 5C.C7 T cell showing extension and retraction of cantilever, according to an embodiment.

The capability to do force-spectroscopy on T cells was also demonstrated. FIG. 11A is a graph that illustrates example force curves of p-MHC on 5C.C7 T cell showing extension and retraction of cantilever, according to an embodiment. The horizontal axis 1102 indicates vertical (Z) displacement in microns of the cantilever The point of contact of the T cell is shown towards the right of the graph where the curve slopes upwards (showing contact and then indentation of the T cell). The vertical axis 1104 indicates the force required to achieve that displacement in nanoNewtons (nN). The top trace 1120 indicates the force curve as the cantilever is extended toward the T cell. The bottom trace 1110 indicates the force curve as the cantilever is retracted from contact with the T cell. Shaded area from about displacement 3.18 microns to about displacement 3.23 microns shows the work of de-adhesion, which is caused by the breakage of TCR-p-MHC bonds. The adhesion is measured, and demonstrates force can be used to break non-covalent bonds between molecules as predicted by the Bell Equations given above. How much force is needed to rupture the bonds is related to loading rate of pulling on the bond by the force spectroscopy equation, Equation 2, above.

Figure 11B:
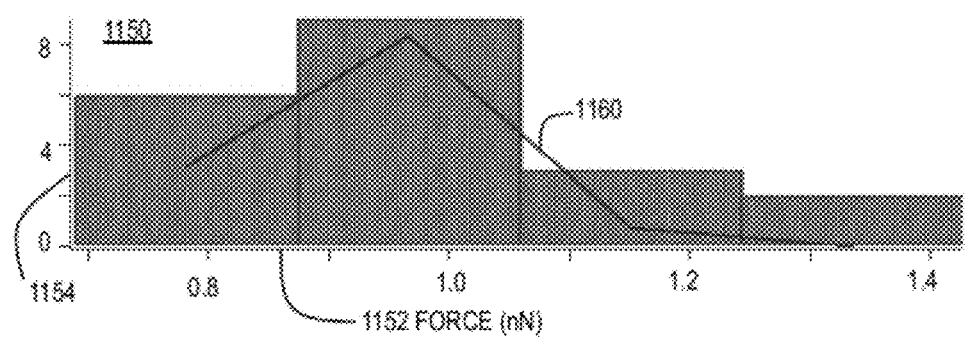
FIG. 11B is a graph that illustrates example force spectroscopy of anti-TCR antibodies on naïve CD4 T cells, according to an embodiment.

FIG. 11BA is a graph that illustrates example force spectroscopy of anti-TCR antibodies on naïve CD4 T cells, according to an embodiment. The horizontal axis 1154 indicates force in nanoNewtons and the vertical axis 1154 indicates counts (e.g., number of events). Bars indicate maximum off rate at each applied force. Trace 1160 indicates a linear fit to the average off rate. The maximum off rate occurs with a force of 0.93 nN (930 picoNewtons, pN, 1 pN=$10^{-12}$ Newtons). This indicates that 0.93 nN of adhesive force is due to the TCR-antibody contact.

2.2.3 Motile Response of T-cells

Figure 11C:
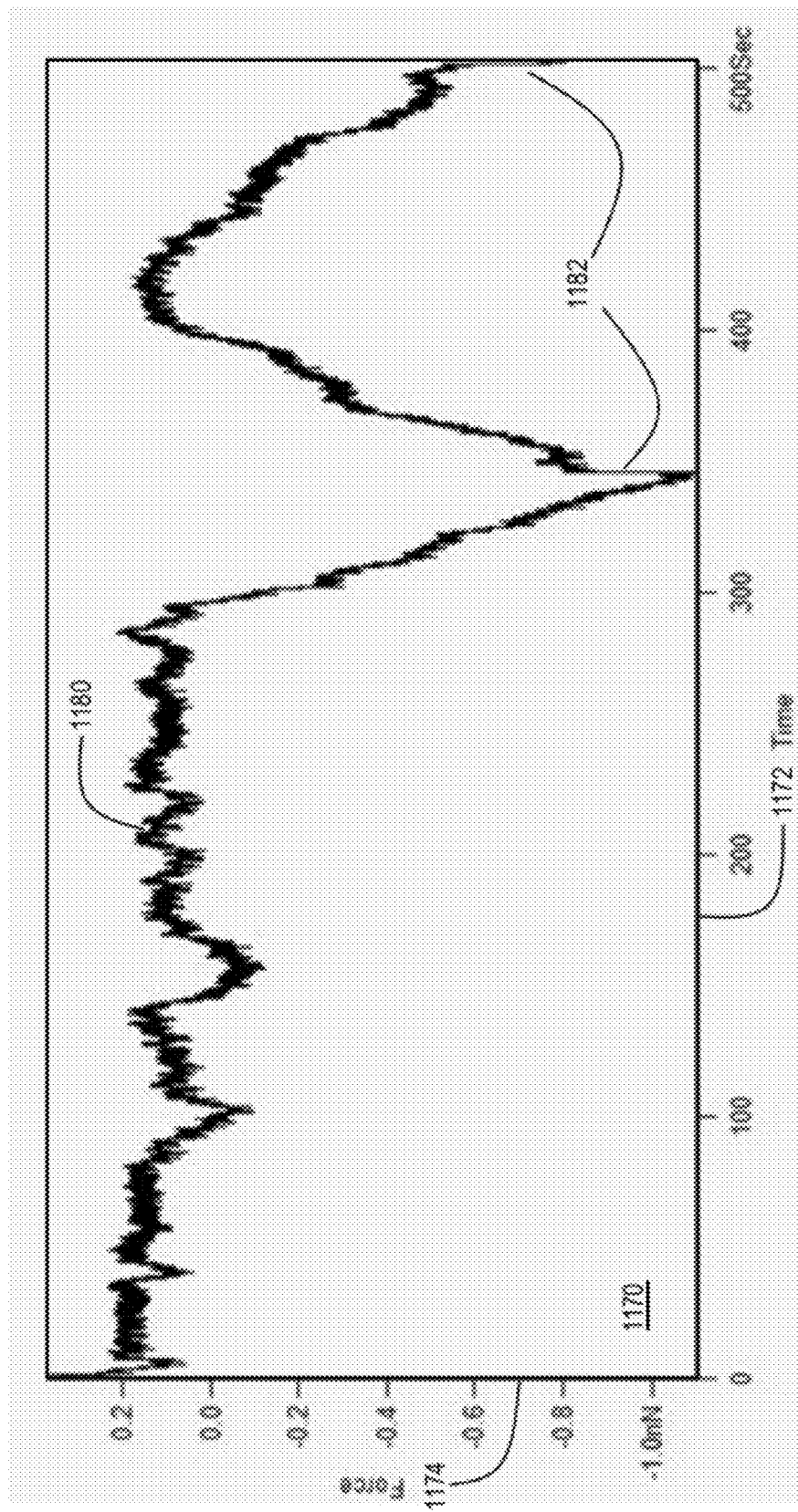
FIG. 11C is a graph that illustrates example motile response of a manipulated T-cell, according to an embodiment.

FIG. 11C is a graph 110 that illustrates example motile response of a manipulated T-cell, according to an embodiment. The horizontal axis 1172 indicates time in seconds. The vertical axis 1174 indicates force in nanoNewtons. Trace 1180 indicates the force applied to the cantilever to deflect the functionalized tip sufficiently to bind to the TCR on the T cell. The contact and indentation of the cell occur at the very left edge of trace 1180. The trace then shows the responses of the cell measured over time as pushing and pulling on the cantilever. Pulling downward is low on the vertical axis 1174, whereas pushing is up on the axis 1174, relative to the starting point. The negative force observed at 300 to 400 seconds and again after about 450 seconds (force valleys 1182) is taken to indicate that the T cell reaches out to push toward the functionalized tip, thus indicating a T cell motility response to manipulation. It is believed that this is consistent with T cell behavior that fosters increased contact with a potential invader to avoid too brief a contact that might delay an appropriate immune response. Thus, the T cell responds to local ligation (triggering) of its T cell receptors by mechanically pushing upon the antigen presenting cell to improve the surface area and quality of contact. Thus, the T cell can become more activated than in a random encounter with an invader, and more effectively scan particles that are filtered through a lymph system. It is anticipated that by being able to deliver local ligation plus force in a particular temporal pattern signaling into the T cell can be optimized.

2.2.4 Effects of Altered Ligand on T-cell Activation

In some embodiments, the effects of different peptides on the integrated signaling of T cells are determined.

For example, it is known that point mutants of a cognate peptide recognized by the TCR can active a T cell, but with altered kinetics or outcomes. For example, these mutations may convert an agonist peptide to a stronger agonist or to an antagonist peptide. Ligation of T cells with antagonist peptides can induce antigen-specific anergy or regulatory T cells. Exploiting altered peptide ligands has become an important therapeutic strategy in cancer immunotherapy and allergy modulation; thus, it is imperative to understand and predict the responses of T cells to altered peptide ligands. This is performed in some embodiments.

It has long been presumed that the different kinetics of binding of variant peptides, as compared with the wild-type peptide, is what drives altered T cell responses. However, fifteen years of studies documenting altered binding kinetics by surface plasmon resonance have been unable to consistently predict the responses of T cells. Even as recently as this year, new approaches to measure the kinetics of pMHC binding to TCRs are still being sought to improve understanding as to why altered peptide ligands change the responses of T cells. However, even recently published approaches have a fundamental flaw because they did not measure nanoscale interactions—the number of TCRs ligated on a T cell was estimated from the surface area of a large bead, and errors in this estimate could significantly bias the calculated affinities.

Figures 12, 13A:
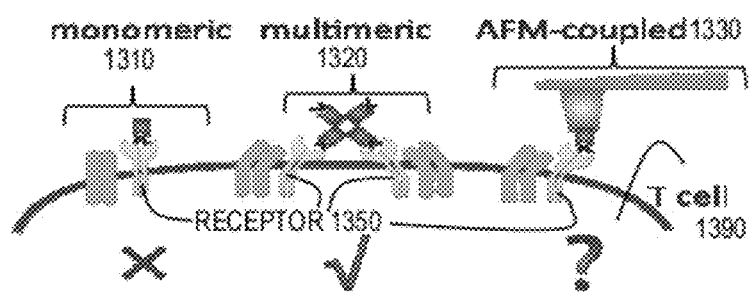
FIG. 12 is a chart that illustrates example ligands for one or more functionalized tips useful in manipulating CD4-T cells, according to an embodiment.
FIG. 13A is a block diagram that illustrates example signaling by induced mechanotransduction, according to an embodiment.

FIG. 12 is a chart that illustrates example ligands for one or more functionalized tips useful in manipulating CD4-T cells, according to an embodiment. The cart lists a peptide identifier 1210 for each of several peptides, along with an associated amino acid sequence 1220 and a T cell signaling role 1230 anticipated for the peptide. The top line indicates an amino acid sequence for wild-type peptide antigen for CD4 T cells from the 5C.C7 T cell receptor transgenic mouse, and the next four lines indicate closely related altered peptide ligands in which the sequence 1220 indicates only the deviations from the wild type MCC peptide sequence. These ligands have variable effects in culture as listed in the role column, and their effects on signal integration are tested in some embodiments.

Such embodiments solve this problem definitively by using AFM to measure the binding kinetics of a single TCR to p-MHC using force spectroscopy. In addition to the definitive measurements of kinetics obtained by AFM, this approach has the added advantage of continuously imaging the manipulated T cell directly during activation, so that a physiological correlate of signaling can be measured immediately and directly.

This embodiment includes covalently attaching p-MHC complexes onto sharp AFM cantilevers with functionalized tips, whose surface area at the tip (about 1-2 nm diameter) allows for a single p-MHC complex to be presented. Altered peptide ligands that bind the 5C.C7 T cell receptor are listed in FIG. 12. In these embodiments, one or more of the p-MHCs of FIG. 12 are coupled onto the cantilever tip, and CD4 T cells obtained from spleens of 5C.C7 TCR transgenic mice are manipulated. One step is performed to establish whether lower affinity ligands (102S) activate T cells as rapidly as the wild-type peptide. Using the z-piezo of the AFM, this AFM cantilever is brought into gentle contact with a 5C.C7 CD4 T cell with about 10 pN of force, which has been found to be sufficient to ligate the TCR but not to induce mechanical strain on the T cell. The cantilever is retracted at a variety of loading rates and the adhesion force is measured, as described above with reference to d FIG. 11B.

During contact, the T cell is monitored by spinning-disk confocal microscopy, whereby the whole cell can be imaged in about 1 second. Thus real-time images of $Ca^{2+}$ influx is measured and collected. In some embodiments, movies are collected by analyzing $Ca^{2+}$ flux (Fluo-4 fluorescence) normalized for dye loading using calcein red-orange at multiple times. Next, the antagonistic peptides (102G and 99R) are tested for their capacity to induce T-cell activation. In prior studies these peptides induced no $Ca^{2+}$ flux when presented by antigen presenting cells for 3-10 minutes, but were not able to be studied in a single-molecule fashion. The 93E99T102A peptide is used as a control; it does not activate T-cell $Ca^{2+}$ flux, but binds to the TCR.

2.2.5 Costimulatory Signaling of T-cells

Ligation of the costimulatory receptor CD28 on T cells has been well established to lower the threshold for T-cell activation, as measured by a lower requirement for antigen by CD4 T cells. Similarly, ligation of the inhibitory receptors CTLA-4 or PD-1 raise the threshold for T-cell activation. Ligation or blockade of these pathways has become a very important therapeutic approach in cancer medicine and autoimmunity.

The effects of costimulatory pathways on T cells have been measured using traditional tools of cellular immunology (e.g., mixing cells in 96-well plates and measuring proliferation or cytokines after a sufficient time has elapsed) that, because of ensemble blurring, do not allow understanding of how much of an effect each receptor ligation has on the threshold for activation. Simple questions like how many "stimulatory" units of co-signaling (e.g., CD28 ligation) are needed to counteract an "inhibitory" unit of co-signaling (e.g., PD-1 ligation) cannot be answered by those traditional approaches, but are fundamentally important to tune T-cell differentiation programs. A quantitative understanding of how T cells interpret costimulatory signals is anticipated to improve capability to therapeutically modify the threshold for T-cell activation.

In this embodiment, p-MHC complex plus either anti-CD28 monoclonal antibodies (mAbs) or anti-PD-1 mAbs are covalently attached onto the tips of AFM cantilevers. CD4 T cells from the 5C.C7 mouse are loaded with 5 µM $Ca^{2+}$ fluorescent dye Fluo-4 (and co-loaded with a $Ca^{2+}$ insensitive dye such as calcein red-orange to normalize dye loading. Naïve T cells are ligated as above. $Ca^{2+}$ flux is measured in three situations: 1) with p-MHC alone on the cantilever, 2) with p-MHC plus anti-CD28, and 3) with p-MHC plus anti-PD-1. It is already known from ensemble analyses that $Ca^{2+}$ flux is influenced by CD28 ligation and PD-1 ligation, so it is assured that $Ca^{2+}$ flux is a valid read-out for the alterations on the threshold for T-cell activation. This approach gives a quantitative readout of the single-molecule effects of costimulation, both stimulatory and inhibitory, and allows development of a model for signal integration in T cells.

2.2.6 Role of Mechanical Forces on Receptors in Signaling of T-cells

In this embodiment, AFM manipulation is used to test the hypothesis that mechanical displacement or torsion of the TCR drives CD3 signaling.

The link between ligation of the TCR by p-MHC and signaling has been elusive, because all known downstream signals are initiated by the CD3 chains associated with TCR. But, it is unknown how TCR binding conveys a signal to CD3. It has been long known that monomeric p-MHC are unable to activate T cells, but oligomers (including tetramers) are able to. Recent work has supported the notion that mechanical forces, either from APC movement or from torsional bending induced by the p-MHC oligomer induce conformational changes in the TCR-CD3 complex that drive downstream signaling event, due to tilting or bending a domain of the CD3E chain away from the membrane to expose tyrosines in the immunoreceptor tyrosine associated activation motifs (ITAMs) for phosphorylation. FIG. 13A is a block diagram that illustrates example signaling by induced mechanotransduction, according to an embodiment. FIG. 13A depicts a T cell 1390 with receptors 1350. Monomeric interaction with a ligand is depicted in portion 1310 of the T cell surface, and is not associated with tilting or bending of the receptor 1350. Multimeric interaction with a ligand is depicted in portion 1320 of the T cell surface, and is associated with tilting or bending of the receptor 1350. It is anticipated that interaction with a functionalized tip of an AFM cantilever, called AFM-coupled interaction herein, depicted in portion 1330 of the T cell surface, will emulate multimeric interaction.

Figure 13B:
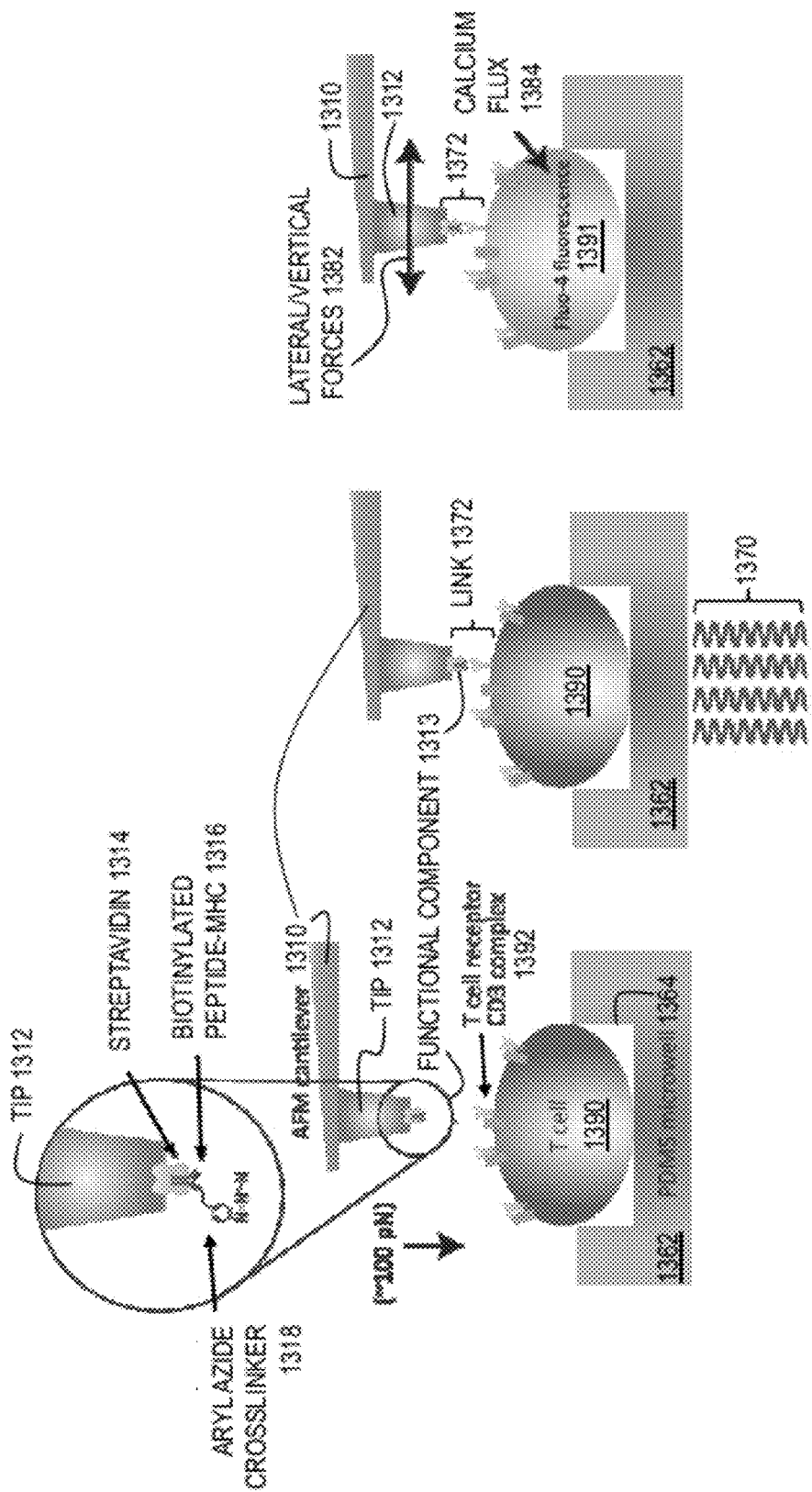
FIG. 13B is a block diagram that illustrates an example experimental setup to determine effects of mechanotransduction, according to an embodiment.

In this embodiment, the AFM cantilever is used to deliver a mechanical signal to a single TCR. A p-MHC that can be covalently UV-crosslinked to a TCR (by virtue of an aryl azide group attached by a short flexible linker to the end of the peptide) is used to functionalize a tip of the AFM cantilever. FIG. 13B is a block diagram that illustrates an example experimental setup to determine effects of mechanotransduction, according to an embodiment. FIG. 13B depicts the AFM cantilever 1310 with tip 1312 functionalized by a functional component 1313 composed of an aryl azide crosslinker 1318 connected by biotinlated peptide MHC 1316 to the streptavidin 1314 biomolecule affixed to the tip 1312. This functional component 1313 binds to a TCR-CD3 complex 1392 on a T cell 1390 restrained in a PDMS microwell 1364 in a PDMS stage 1362 to form a link 1372.

In this embodiment, the tip 1312 functionalized with this p-MHC functional component 1313, is controlled to gently touch the T cell. The crosslinker is polymerized to the receptor by UV exposure indicated by UV waves 1370 (e.g., for about 30 seconds), at a typical photon dose used for microscopy, to form link 1372. The AFM cantilever is controlled to deliver small lateral/vertical displacement or torsional forces 1382 to induce motions to the link 1372 and receptor while continuously imaging the T cell for evidence of activation. A broad range of displacements (in a range from about 0.5 nm to about 90 μm) along with a broad range of forces (in a range from about 1 pN to about 10 nN) are possible with an example AFM. Activation is assessed by measuring $Ca^{2+}$ flux 1384 by confocal microscopy, as described above. For example the activated T cell 1391 fluoresces with Fluo-4 fluorescence in an amount related to the calcium flux 1384.

The impact and significance of this technology to study receptor biology on live cells are far-reaching, since current methodologies to study receptor signals limited to traditional ensemble analyses (e.g., 96-well plates) or cannot target single molecules (e.g., optical trapping of beads or cells). In addition, the embodiments described herein provide the first experimental evidence of single-molecule kinetics of the TCR, while at the same time allowing confocal live imaging of the effects of single-TCR activation. Furthermore, the experimental embodiments also described here provide the basis for cellular reprogramming using AFM. Exciting anticipated embodiments for this technique include: induction of antigen-specific T cell anergy in transplantation, provision of pre-differentiated T cells in severe infection responses, or programming of mechanically sensitive stem cells to particular lineage fates. The results of these embodiments provide insight for the future for both reductionist in vitro experiments, as well as for in vivo studies in regenerative medicine, infectious disease, and translational immunology.

3. Interacting with Living Cardiomyocyte

In another set of embodiments, techniques include mounting a living cardiomyocyte on a stage of a microscale cantilever with a nanoscale tip. A controller for the microscale cantilever is operated to cause the nanoscale tip to contact the cardiomyocyte at a predetermined pressure. After turning off vertical deflection feedback, deflection data that indicates a time series of nanoscale vertical deflections of the microscale cantilever caused by the living cardiomyocyte is collected. In some of these embodiments, the beat characteristics of the living cardiomyocytes are used to assess development of replacement cardiomyocytes and other treatments of cardiac disease.

Diseases of cardiomyocytes, either primary (e.g., genetic cardiomyopathies) or acquired (e.g., myocardial infarction), are of major importance to health across the world. Understanding the physiology and pathophysiology of these vital cells has been the subject of research for over two centuries. Obtaining human biopsy specimens from diseased patients, however, requires expensive and invasive procedures, which may be poorly tolerated by children or the critically ill. Recent breakthroughs in induced pluripotent stem cells (iPSC) and in genetic engineering of human embryonic stem cells (hESC) have made human disease-specific cardiomyocytes available for elucidating mechanisms of specific cardiac diseases. To understand the mechanobiological properties of these stem cell-derived cardiomyocytes, embodiments were developed to measure contractile forces, beat frequencies and durations, and membrane stiffness of live, beating cells.

These techniques use atomic force microscopy (AFM) to quantify the mechanobiological properties of pluripotent, stem cell-derived cardiomyocytes, including contraction force, rate, duration and membrane stiffness. Beats were measured from cardiomyocytes derived from induced pluripotent stem cells and from embryonic cells of healthy subjects and those with dilated cardiomyopathy. It is found that these AFM techniques could quantify beat forces of single cells and clusters of cardiomyocytes, and could detect the inotropic (increase in force of contraction) effect of the drug norepinephrine. Cardiomyocytes derived from subjects with dilated cardiomyopathy show decreased force and decrease membrane stiffness compared to controls. The AFM-based techniques described here can serve as a screening tool for the development of cardiac-active pharmacological agents, as a platform for studying cardiomyocyte biology, or as a mechanism to fine-tune the choices of treatments for patients in heart failure.

AFM has been used to study cardiomyocytes in the past, but some of these efforts required synchronizing the z-piezo of the AFM with beating of the cardiomyocytes, which created fluidic disturbances that prevented accurate measurement of contraction forces. The techniques described here touch the cell gently with the AFM cantilever, then lock the z-piezo, which forces contractions of the cell to deflect the cantilever, which deflections are measured. Multiplying the measured deflection by the spring constant allows calculation of the contraction force.

3.1 Method

Figure 14A:
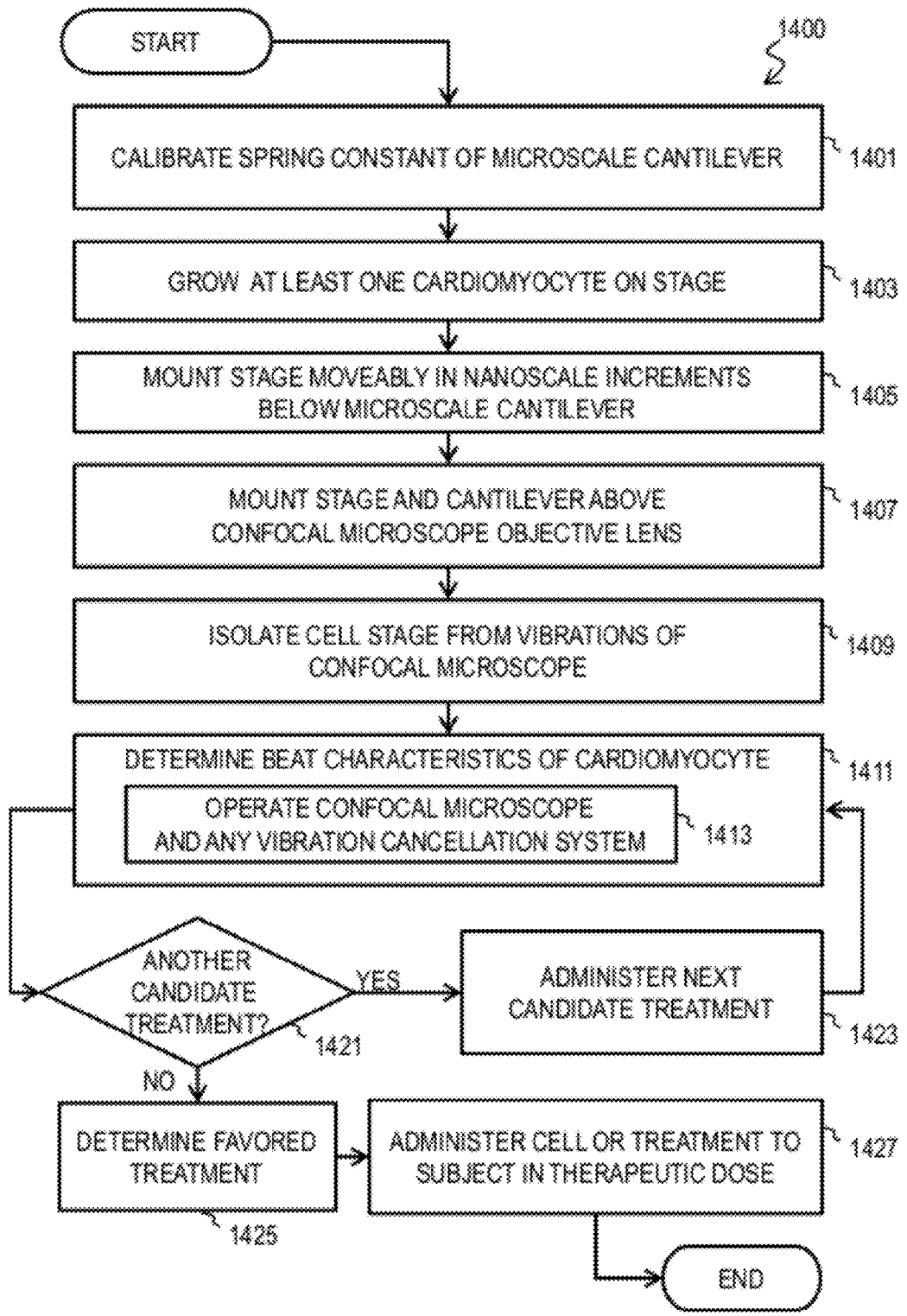

FIG. 14A and FIG. 14B are flow charts that illustrate an example method 1400 for an AFM to interact with a living cardiomyocyte, according to an embodiment.

In step 1401 a spring constant for a microscale cantilever is determined. Any method known in the art may be used. For example, in an illustrated embodiment, the spring constant of the AFM cantilever was calibrated using the thermal noise method described in Hutter, J. L., and Bechhoefer, J., "Calibration of Atomic-Force Microscope Tips," *Review of Scientific Instruments*, v64, pp 1868-1873, 1993. The typical spring constant for these cantilevers was around 0.04 Newtons per meter (N/m) for deflections up to hundreds of nanometers. Thus, in some embodiments, a method includes calibrating a spring constant for the microscale cantilever.

In step 1403, at least one cardiomyocyte is grown on a stage for the AFM. Any method may be used to grow one or more cardiomyocytes. In the illustrated embodiments, one or more normal or diseased living cardiomyocytes were grown in a gel from stems cells.

To obtain beating cardiomyocytes from stem cells, either the hESC line H7 or skin fibroblast-derived iPSCs were used as a starting cell. By using a well-established method to differentiate these pluripotent stem cells to the cardiac lineage, bona fide cardiomyocytes were successfully derived. (See, for example, Sun N, Yazawa M, Liu J, Navarrete E G, Sanchez-Freire V, et al. "Patient-specific induced pluripotent stem cell as a model for familial dilated cardiomyopathy," *Science Translational Medicine*, (in review at time of this writing); and, Yang L, Soonpaa M H, Adler E D, Roepke T K, Kattman S J, et al. "Human cardiovascular progenitor cells develop from a KDR+ embryonic-stem-cell-derived population," *Nature* v453, pp 524-528, 2008)

These pluripotent stem cell-derived cardiomyocytes expressed the cardiac markers cardiac troponin T (cTnT), sarcomeric α-actinin, and myosin light chain 2a (MLC2a), though their spatial organization is more rounded than rectangular as is seen in cardiomyocytes obtained from heart tissue. Moreover, they beat spontaneously in vitro. These stem-cell derived cardiomyocytes were grown on gelatin coated glass-bottom petri dishes, and were firmly attached—detachment of the cells was never observed due to the AFM cantilever. During culture, the iPSC-CMs may form large clusters comprising dozens of cells that could also be measured by AFM in subsequent steps. Thus, in some embodiments, mounting the living cardiomyocyte on the stage further comprises growing the cardiomyocyte in a gel on the stage for an AFM. In some embodiments, mounting the living cardiomyocyte on the stage further comprises growing a cluster of cardiomyocytes in a gel on the stage for the AFM. In some embodiments, the living cardiomyocyte is grown from at least one of an induced pluripotent stem cell (IPSC) or an human embryonic stem cell (hESC).

In step 1405 the AFM stage is mounted below the microscale cantilever so that the stage and cantilever can move relative to each other in nanoscale increments, as described above with respect to step 305 of FIG. 3. Thus, in some embodiments, a method includes mounting a living cardiomyocyte on a stage of a microscale cantilever with a nanoscale tip.

In some embodiments, the AFM stage is mounted in the focal plane of a confocal microscope system, such as confocal microscope 120. In such embodiments, the method 1400 of FIG. 14 includes steps 1407 or step 1409, or both. For example, in embodiments that determine the response of a cell to manipulation by the AFM, fluorescent molecular probes are often used, which probes are detected by the confocal microscope system or some other microscope system.

In step 1407, the AFM stage and cantilever are mounted above the objective lens of a confocal microscope, such a confocal microscope 120. If the confocal microscope has a source of vibration, e.g., spinning Nipkow disc, which would affect the motion and operation of the AFM, then, in step 1409, the cell stage is isolated from these vibrations, as described above for steps 307 or 309.

In step 1411, the beat characteristics of the living cardiomyocyte are determined using the AFM, as described in more detail below with reference to FIG. 14B. In some embodiments, step 1411 includes operation of the confocal microscope. In such embodiments, the confocal microscope along with any vibrational cancellation system is operated in step 1413.

In step 1421, it is determined whether there is a candidate treatment still to be tried. If so, then in step 1423, a next (first or different) candidate treatment is administered to one or more cardiomyocytes and control passes to step 1411 to determine the beat characteristics of the treated cardiomyocytes. For example, in some embodiments, norepinephrine (NE, 4-[(1R)-2-amino-1-hydroxyethyl]benzene-1,2-diol), a demethylated form of epinephrine that non-specifically activates both alpha-1 and beta-1 adreneregic receptors is a candidate treatment. NE has long-established effects as both a positive inotrope, and to lesser extent, a positive chronotrope as well. Thus, in some embodiments, a method also includes treating the living cardiomyocyte and determining efficacy of treatment based on a change in beat characteristics of the living cardiomyocyte before and after treatment.

If it is determined in step 1421 there are no further candidate treatments, then control passes to step 1425 to determine a favored treatment among the candidate treatments. For example, as described below, a dose of an inotrope or chronotrope that has the best effect on beat characteristics for cardiomyocytes representative of a particular cardiac disease is selected as a favored treatment. In step 1427, the favored treatment for that disease is administered in a therapeutic dose to a subject.

In an example embodiment, step 1411 also includes the steps of method 1440 depicted in FIG. 14B. Thus, method 1440 is a particular embodiment of step 1411.

In step 1441, the nanoscale tip of the microscale cantilever of the AFM is controlled to apply gentle pressure to a location on the cardiomyocyte. For example, as shown in FIG. 2B, the AFM cantilever 272 is manipulated so that the tip 274 indents the cardiomyocyte 292 attached to an AFM stage 280. In experimental embodiments described in more detail below, one or more cardiomyocytes were gently contacted by the cantilever tip with 100 pN of force, producing a typical cellular indentation of about 200 nm to about 500 nm. In various embodiments the contact force falls in a range from about 0.05 to about 1 nN. Thus, in some embodiments, a method includes operating a controller for the microscale cantilever to cause the nanoscale tip to contact the cardiomyocyte at a predetermined pressure.

In step 1443, the indentation is measured and the vertical deflection feedback is turned off to allow the cantilever to move with the contractions of the beating cardiomyocyte. In some embodiments, this involves turning off feedback to the z-piezo actuator of the AFM. For example, the force applied by the AFM controller is not changed from the force involved to obtain the initial indentation. The initial deflection after applying the gentle force is the initial indentation. Thus, in some embodiments, a method includes operating the controller to turn off vertical deflection feedback after contacting the cardiomyocyte.

Figure 15:
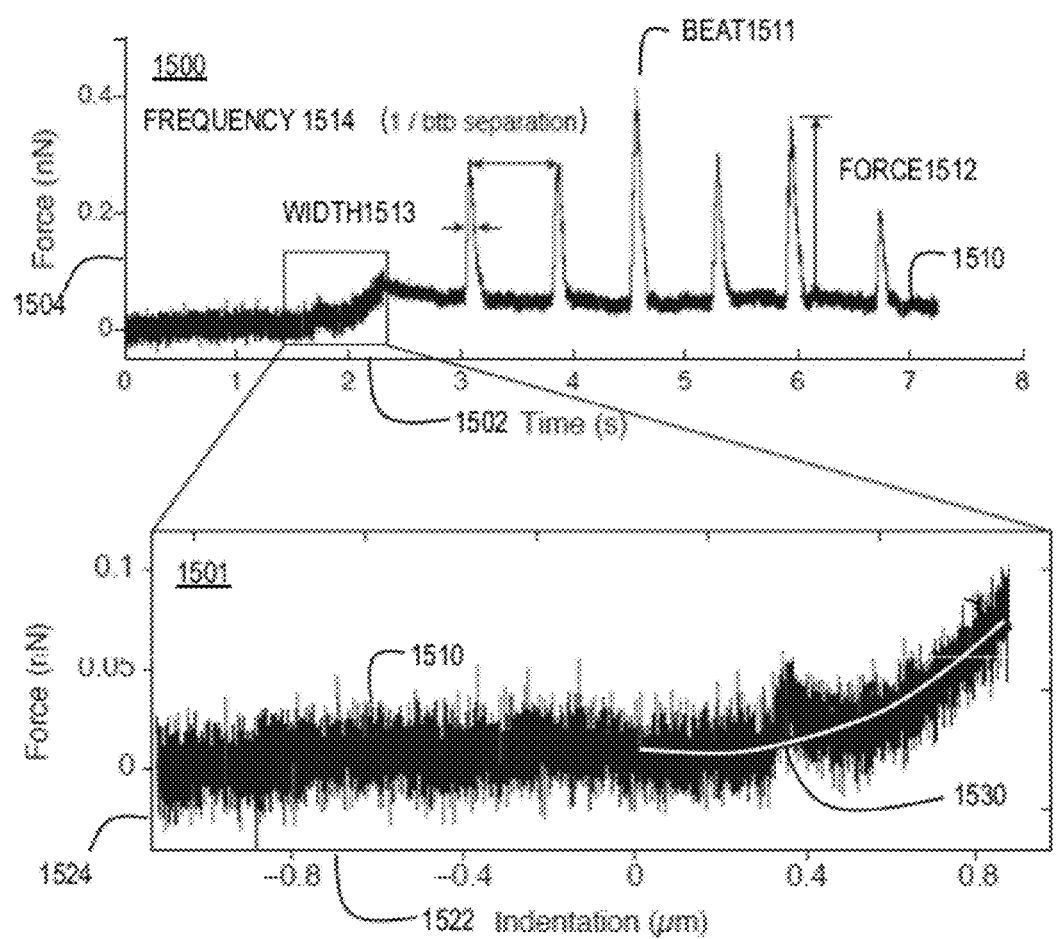
FIG. 15 is a graph that illustrates an example measured force time series when the AFM cantilever interacts with the living cardiomyocyte, according to an embodiment.

In step 1445, the time history of vertical deflection of the cantilever at the location on the cell is measured and recorded. FIG. 15 is a graph 1500 that illustrates an example measured force time series when the AFM cantilever interacts with the living cardiomyocyte, according to an embodiment. The horizontal axis 1502 indicates time in seconds; and the vertical axis 1504 indicates force in nN applied to vertically deflect the cantilever. The force trace 1510 shows initial contact with the cardiomyocyte and then a series of six beats 1511. Each beat 1511 is characterized by a force 1512 from a baseline value to the peak value, by a width (duration) 1513 given by the full width at half maximum height of the beat, and by a frequency 1514 equal to a reciprocal of the beat to beat (btb) separation.

In the illustrated embodiment, the cantilever is moved vertically with little force for over one second until it contacts the cardiomyocyte, then additional vertical deflection requires additional force from the z-piezo controller to indent the cardiomyocyte. After this indentation, the z-piezo (vertical) feedback control is turned off to allow the cantilever to be deflected by the beating cardiomyocyte. The deflection is detected and the force is computed from the deflection and the spring constant of the cantilever.

An expanded view of this ramp up force is plotted in the insert graph 1501 with vertical axis 1524 showing a force range from about 0 to about 0.1 nN (100 pN). The trace 1510 is shown on an expanded time axis, not shown. The indentation of the cell is determined by the vertical deflection of the cantilever during the force ramp up of trace 1510. Trace 1530 give the indentation (e.g., observed vertical deflection of the cantilever) as the force increases as indicated by the horizontal axis 1522 of indentation in microns after contact with the cell at about 1.5 seconds. Thus, when the force is zero, the indentation is zero and when the force increases to 0.08 nN (80 pN), the indentation increases to about 0.9 microns (900 nanometers). The fit of indentation curve 1530 by using Hertz model produces the Young's modulus (indicative of local stiffness) of the cell membrane at the contact point. Thus, in some embodiments, a method includes, after turning off vertical deflection feedback, collecting deflection data that indicates a time series of nanoscale vertical deflections of the microscale cantilever caused by the living cardiomyocyte.

In step 1447, beat characteristics of the cell are determined. For example, the beat force, duration (width) and rate (frequency) are determined based on the time history of vertical deflection in trace 1510. Thus, in some embodiments, a method also includes determining beat characteristics of the cardiomyocyte based on the deflection data. In some embodiments, of the method, the beat characteristics include at least one of a peak force, a peak duration or a peak frequency.

In step 1449, it is determined whether measurements are to be made at another location on the same cell. If so, control passes back to step 1441 to contact the cell at another location. If not, control passes to step 1451.

In step 1451, the beat characteristics of the cell are determined by combining the beat characteristics from one or more locations on the cell. The beat characteristics of the cell were assessed at a point on each cell's surface that presented the greatest beat force, and the variation of beat forces across single cells was also determined in some embodiments. The measurements from the experimental embodiments described below show that the cardiomyocytes derived from iPSC and hESC contract with the similar mechanical properties and support the use of stem cell-derived cardiomyocytes as a model system.

In step 1453, it is determined whether measurements are to be made at another cell in a cluster of multiple cells. If so, control passes back to step 1441 to contact another cell at a new location. If not, control passes to step 1455.

In step 1455, the beat characteristics of the cluster are determined by combining the beat characteristics from one or more locations on each of one or more cells in the cluster. For example, the consistency of contraction force and frequency shows that cardiomyocytes behave more synchronously when in contact with other cardiomyocytes in a cluster than when solitary. This result is consistent with the known existence of cardiac gap junctions, which allow for the spread of action potentials across cardiomyocytes. Together, these results show that AFM can be used to measure a solitary cardiomyocyte and the more physiologically relevant aggregates of cardiomyocytes. Thus, in some embodiments, a method further comprising determining beat characteristics of the cluster based on the deflection data.

In various embodiments, the computer system 140 controls one or more operations of the AFM, e.g., using the AFM controller acquisition module 154. In some embodiments, the derivation of beat characteristics and stiffness is made by the analyzer 156. In some such embodiments, a computer-readable medium carrying one or more sequences of instructions causes the apparatus 100 to control the cantilever to cause the nanoscale tip to contact a living cardiomyocyte at a predetermined pressure during step 1441. The apparatus 100 is also caused to control the cantilever to turn off vertical deflection feedback after contacting the cardiomyocyte during step 1443. The apparatus 100 is also caused to collect deflection data that indicates a time series of nanoscale vertical deflections of the microscale cantilever caused by the living cardiomyocyte during step 1445.

3.2. Example Embodiments

In the following sections, various embodiments of the techniques are applied to cardiomyocytes derived from stem cells in various configurations. All the protocols for these embodiments were approved by the Stanford University Human Subjects Research Institutional Review Board. H7 hESC line was maintained on Matrigel-coated feeder-free culture dishes with mTESR-1 human pluripotent stem cell medium (from STEMCELL TECHNOLOGIES™ of Vancouver, Canada). Generation, maintenance, and characterization of patient-specific iPSC lines were performed as previously described in Park I H, Lerou P H, Zhao R, Huo H, Daley G Q, "Generation of human-induced pluripotent stem cells," *Nat Protoc*, v3, pp 180-1186, 2008; and, Sun N, Panetta N J, Gupta D M, Wilson K D, Lee A, et al., "Feeder-free derivation of induced pluripotent stem cells from adult human adipose stem cells," *Proc Natl Acad Sci USA*, v106, pp 15720-15725, 2009. Briefly, fibroblasts were grown from skin biopsies taken from individual subjects and reprogrammed with lentiviral Yamanaka 4 factors (Oct4, Sox2, Klf4, and c-MYC) under feeder-free condition. Colonies with TRA-1-60+ staining and hESC-like morphology were picked, expanded, and established as individual iPSC lines. DCM iPSC lines were confirmed to contain the specific R173W mutation by genomic PCR and DNA sequencing. All established iPSC lines expressed the pluripotency markers Oct4, Nanog, TRA-1-81, and SSEA-4, and were positive for alkaline phosphatas.

H7 hESCs and iPSCs were differentiated to the cardiomyocyte lineage using a three dimensional (3D) differentiation protocol modified from Yang and colleagues in Yang L, Soonpaa M H, Adler E D, Roepke T K, Kattman S J, et al., "Human cardiovascular progenitor cells develop from a KDR+ embryonic-stem-cell-derived population," Nature v453 pp 524-528, 2008. Briefly, embryoid bodies (EBs) were formed in basic media (StemPro34 from INVITROGEN™ of Carlsbad, Calif., containing 2 mM glutamine from INVITROGEN™, 0.4 mM monothioglycerol, from SIGMA ALDRICH™ of St. Louis, Mo., 50 µg/mL ascorbic acid from SIGMA ALDRICH™, and 0.5 ng/mL BMP4 from R&D SYSTEMS™ of Minneapolis, Minn.) by dissociating hESCs or iPSCs with Accutase (SIGMA ALDRICH™) to small clumps containing 10-20 cells on day 0. Cardiac specification of EBs was performed by adding BMP4 (10 ng/mL), human bFGF (5 ng/mL), and activin A (3 ng/mL) to the basic media on day 1-4. On day 4-8, EBs were refreshed with basic media containing human DKK1 (50 ng/mL) and human VEGF (10 ng/mL), followed by basic media containing human bFGF (5 ng/mL) and human VEGF (10 ng/mL) starting day 8. All factors were obtained from R&D SYSTEMS™. Cultures were maintained in a 5% CO2/air environment. Spontaneous beating was observed as early as day 8 post differentiation. Beating EBs were separated by collagenase I into small beating clusters and single beating cardiomyocytes for further analyses. Norepinephrine was obtained from SIGMA ALDRICH™.

In step 1403, iPSC or hESC cardiomyocytes were seeded on a culture dish with a cover glass bottom (Fluorodish from WORLD PRECISION INSTRUMENTS, INC.™ of Sarasota, Fla.). Just before the experiments, the culture media was changed to Tyrode's solution (10 mM pH 7.4 HEPES, 140 mM NaCl, 1.8 mM $CaCl_2$, 5.4 mM KCl, 1 mM $MgCl_2$, 10 mM glucose) and maintained at 36° C. for the entire experiment. To ensure that transient thermal effects were not affecting the cantilever deflection, the cantilever was equilibrated in the warm buffer prior to any experimental measurements until the deflection was unchanging, for at least 20 minutes. Beating cells were interrogated during step 1411 by using AFM (MFP-3D Bio from ASYLUM RESEARCH™ of Goleta, Calif.) that was mounted with a SiNi probe (BUDGETSENSORS™ of Sofia, Bulgaria). In step 1441, cells were gently contacted by the cantilever tip with 100 pN of force, with a typical cellular indentation of 200-500 nm. During step 1445, the cantilever tip remained in position with the Z-piezo feedback off for multiple, sequential, two-minute intervals while deflection data were collected at an acquisition rate of 2 kHz. Cell beats were measured for multiple, sequential intervals that were usually about 1 to 2 minutes long. Typical noise levels during these measurements were around 20 pN as shown in the force trajectory of FIG. 15.

In these embodiments, during step 1447, the resulting data were analyzed in MATLAB™ (from MATHWORKS™ of Natick Mass.) to calculate the force, rate, and duration of each beat. These steps included: 1. load the data files and convert the deflection trajectory to force trajectory by multiplying the deflection by the spring constant; 2. pick up the portion of the deflection signal corresponding to the time spent dwelling in contact with the cell surface;. 3. calculate a baseline and do a baseline correction of dwelling trajectory; 4. identify the positions of peaks in the dwelling trajectory; 5. smooth the dwelling trajectory; 6. calculate the amplitude of each peak, which gives the beating force; 7. calculate the full width at half maximum (FWHM) of each peak that gives beat duration (width); 8. calculate interval times between consecutive peaks that gives beat-to-beat time and take the reciprocal of beat-to-beat time to give the beating frequency; 9. save the beating force, beating duration, beat-to-beat time and frequency of each individual peaks of one trajectory into a file; 10. calculate the mean and coefficient of variation (CV) of beating force, beating duration and beating frequency; 11. plot the statistical histograms of beating force, beating duration and beating frequency respectively.

To measure stiffness, the indentation that occurred prior the deflection of cantilever reaching the trigger force was observed. The function of force vs. indentation distance (e.g., trace 1530) was fit by using the Hertz model, using code in the ASYLUM RESEARCH™ software. A Poisson's value of 0.5 was used for the cell. The fit produces the Young's modulus of the cell at the contact point. Stress relaxation is unavoidably seen in stiffness measurements of live cells, because of reorganization of cytoskeletal and other components in response to local indentation—in this regard, the inverse Young's moduli reflect "dynamic compliance" rather than static compliance.

Because the orientation of actin-myosin filaments within a cardiomyocyte is anisotropic, different parts of the CM show different amounts of movement and contractile forces with each beat. To measure the spatial heterogeneity of contraction force, a method called "dwell mapping" was developed. By superimposing a grid on the cell, the cell was comprehensively mapped by dwelling the cantilever at each point on the grid for an interval that would enable the measurement of a few beats in the loop comprising steps 1441 to 1449. In practice, grids comprising 100-1000 points were sampled, most of which fell onto the cell and some of which fell onto the glass surface. Dwell mapping enabled mapping the local height and local elasticity or stiffness (Young's modulus) of the cell simultaneously with the local contraction force.

For the dwell mapping measurements, the AFM control program moves the piezo-driving stage to scan an area typically with about 10 to 30 lines and about 10 to 30 locations per line. At each location, the AFM probe dwells on the cell for about 10 seconds to measure contractions. From these measurements, the contraction force and cell membrane stiffness are calculated. Cell height is measured by the point of contact for each force curve at each point on the cell. Contour plots were calculated automatically using the R package ggplot2 (function stat_density2d with bins=5) (see Wickham H, ggplot2: elegant graphics for data analysis, Springer-Verlag New York Inc 2009).

3.2.1 Differences Between iPSC and hESC Sources of Cardiomyocytes

Both the iPSC and hESC cardiomyocytes contract rhythmically in the axial direction, but the force, duration and frequency vary across independent single cells.

Figure 16A:
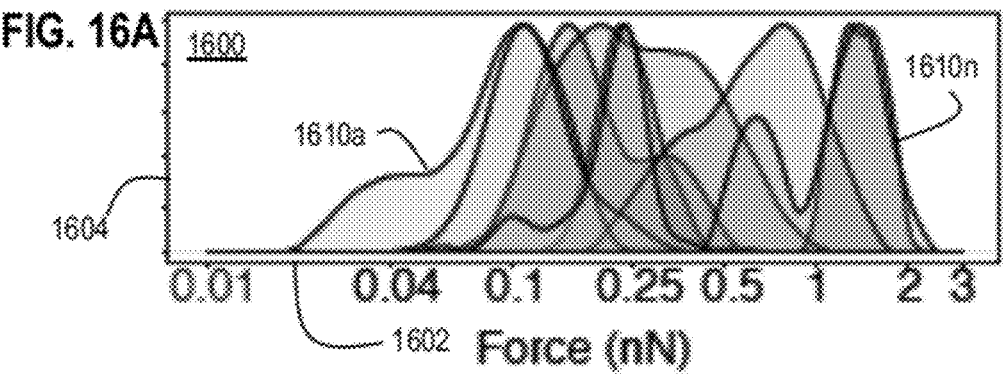
FIG. 16A through FIG. 16C are graphs which show differences in histograms of beat force for corresponding cardiomyocytes between those derived from iPSC and hESC stem cells, according ot various embodiments.
Figure 16B:
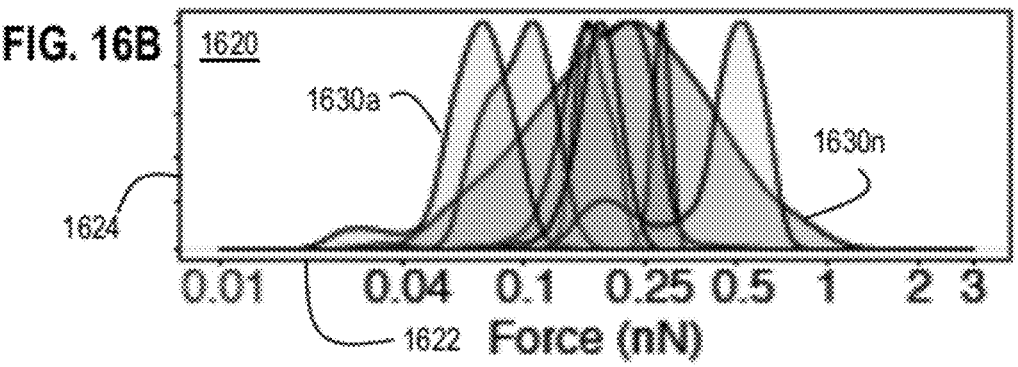
Figure 16C:
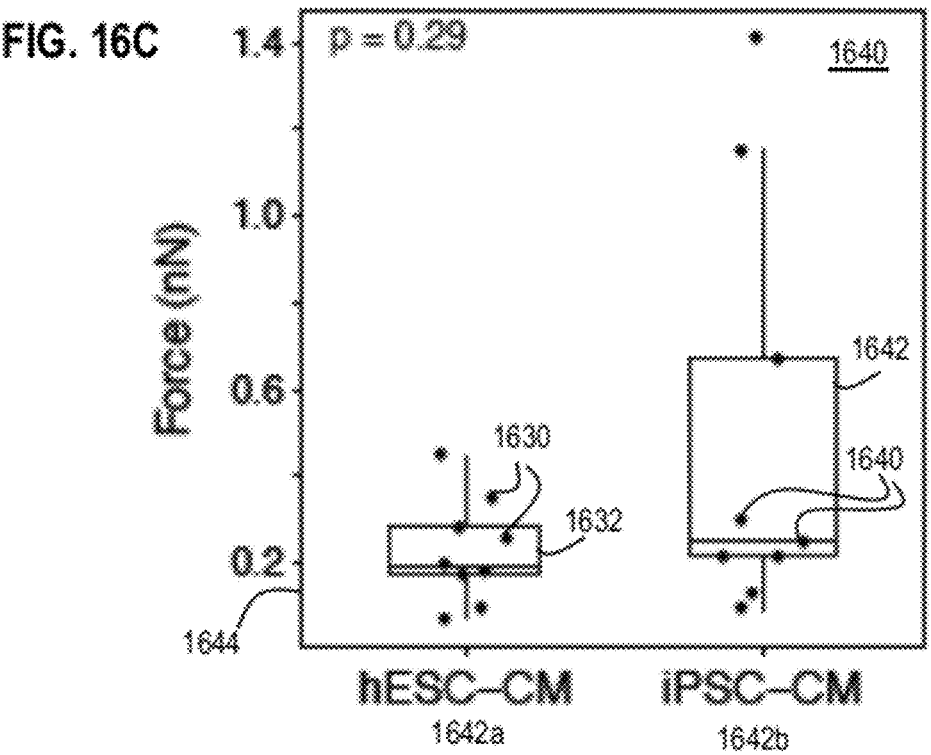

Beat force is somewhat different for the two types of cardiomyocytes. FIG. 16A through FIG. 16C are graphs which show differences in histograms of beat force for corresponding cardiomyocytes between those derived from iPSC and hESC-CM stem cells, according to various embodiments. FIG. 16A is a graph 1600 with logarithmic horizontal axis 1602 indicating beat force in nN and vertical axis 1604 indicating relative number of occurrences. Each curve 1610*a* through 1610*n* in the plot is the smoothed histogram of the force of beats of a single cardiomyocyte derived from an iPSC (iPSC-CM) measured at a single site on each cell. FIG. 16B is a graph 1620 with logarithmic horizontal axis 1622 indicating beat force in nN and vertical axis 1624 indicating relative number of occurrences. Each curve 1630*a* through 1630*n* in the plot is the smoothed histogram of the force of beats of a single cardiomyocyte derived from an hESC (hESC-CM) measured at a single site on each cell. The histograms of the iPSC-CM show a broader range into higher force contractions than do the histograms for hESC-CM. FIG. 16C is a graph 1640 with horizontal axis 1642 comprising portions 1642*a* and 1642*b* indicating two types of cardiomyocytes; and vertical axis 1644 indicating force in nanoNewtons. Statistical analysis is plotted showing means of individual cells (dots), plus 25th, 50th, and 75th percentile quantiles (box) and range of all points (whiskers). A p value from statistical comparison by t test is shown.

The iPSC-CM beat comparably to hESC-derived cardiomyocytes hESC-CM), with contraction forces of 0.49±0.45 nN (n=9) and 0.23±0.11 nN (n=9), respectively (p=0.29). The slight difference in beat forces is probably significant. The total force output of these cells may be higher than measured, because there may be lateral modes of the contraction that are not measured by this method.

Figure 17A:
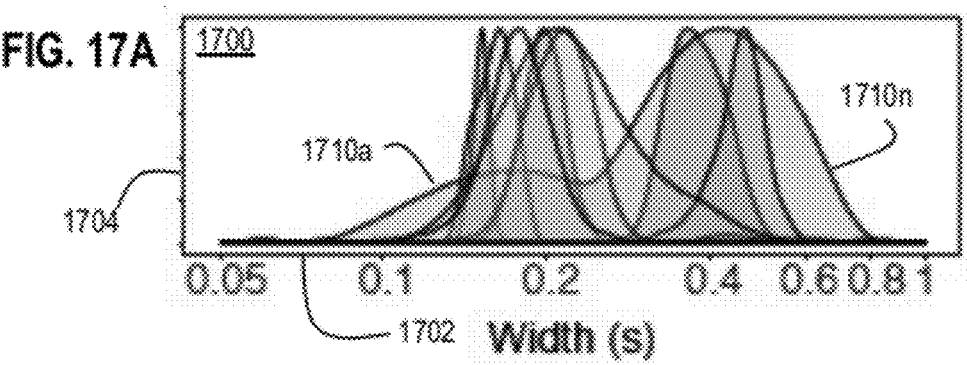
FIG. 17A through FIG. 17C are graphs which show differences in histograms of beat width (duration) for corresponding cardiomyocytes between those derived from iPSC and hESC stem cells, according to various embodiments.
Figure 17B:
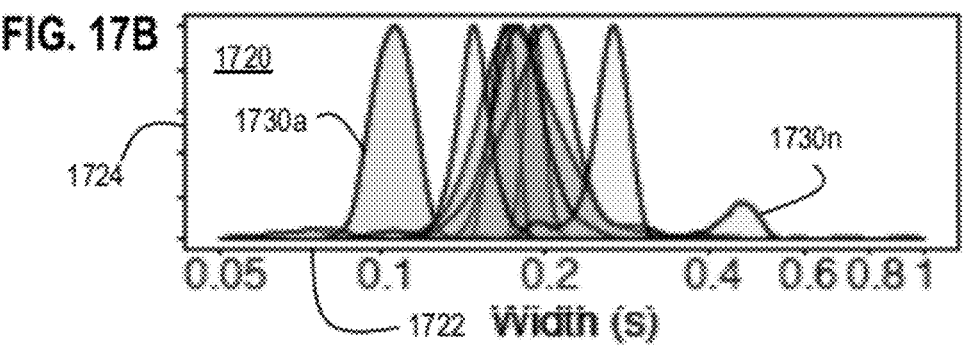
Figure 17C:
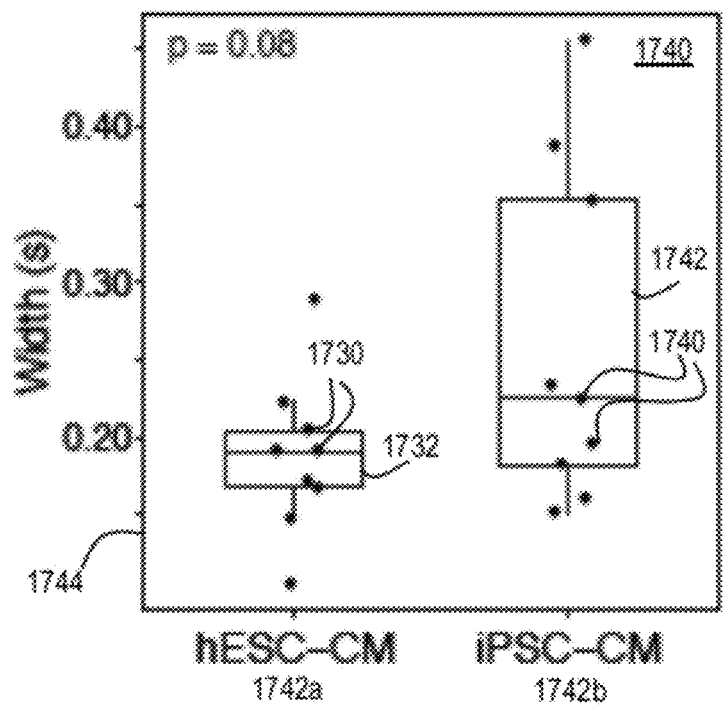

FIG. 17A through FIG. 17C are graphs which show differences in histograms of beat width (duration) for corresponding cardiomyocytes between those derived from iPSC and hESC-CM stem cells, according of various embodiments. FIG. 17A is a graph 1700 with logarithmic horizontal axis 1702 indicating beat width (duration) in seconds and vertical axis 1704 indicating relative number of occurrences. Each curve 1710*a* through 1710*n* in the plot is the smoothed histogram of the width of beats of a single cardiomyocyte derived from an iPSC-CM measured at a single site on each cell. FIG. 17B is a graph 1720 with logarithmic horizontal axis 1722 indicating beat width in seconds and vertical axis 1724 indicating relative number of occurrences. Each curve 1730*a* through 1730*n* in the plot is the smoothed histogram of the width of beats of a single cardiomyocyte derived from an hESC-CM measured at a single site on each cell. The histograms of the iPSC-CM show a broader range into higher duration contractions than do the histograms for hESC-CM. FIG. 17C is a graph 1740 with horizontal axis 1742 comprising portions 1742*a* and 1742*b* indicating two types of cardiomyocytes; and vertical axis 1744 indicating width in seconds. Statistical analysis is plotted showing means of individual cells (dots), plus 25th, 50th, and 75th percentile quantiles (box) and range of all points (whiskers). A p value from statistical comparison by t test is shown.

The mean beat durations were 0.26±0.06 s (n=9) and 0.19±0.05 s (n=9) for iPSC-CMs and hESC-CMs, respectively (p=0.075). The slight difference in beat widths is significant.

Figure 18A:
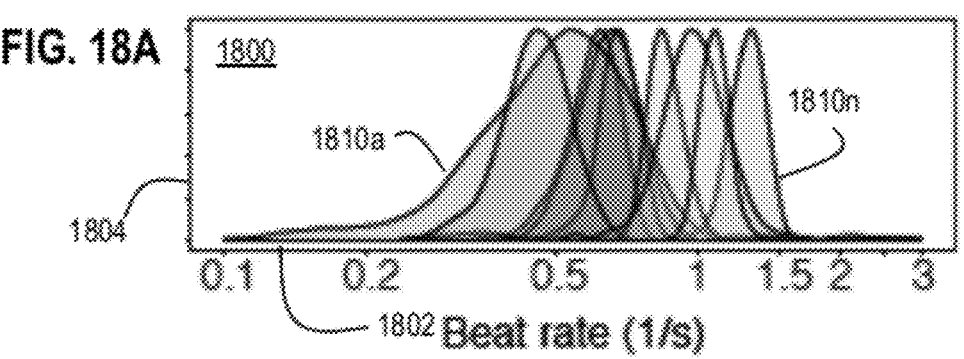
FIG. 18A through FIG. 18C are graphs which show differences in histograms of beat rate (frequency) for corresponding cardiomyocytes between those derived from iPSC and hESC stem cells, according ot various embodiments.
Figure 18B:
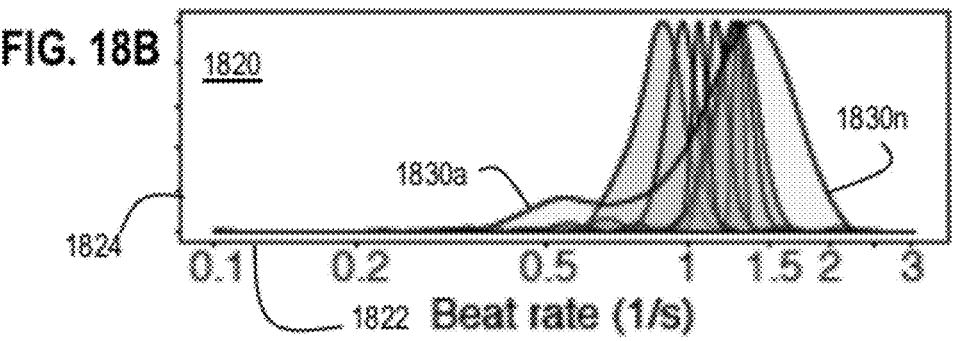
Figure 18C:
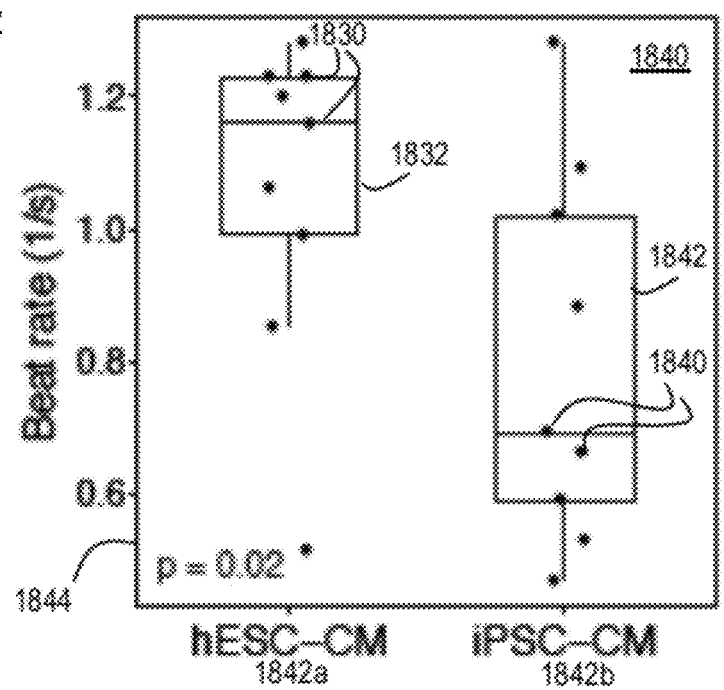

FIG. 18A through FIG. 18C are graphs which show differences in histograms of beat rate (frequency) for corresponding cardiomyocytes between those derived from iPSC and hESC-CM stem cells, according to various embodiments. FIG. 18A is a graph 1800 with logarithmic horizontal axis 1802 indicating beat rate (frequencies) in inverse seconds and vertical axis 1804 indicating relative number of occurrences. Each curve 1810*a* through 1810*n* in the plot is the smoothed histogram of the rate of beats of a single cardiomyocyte derived from an iPSC-CM measured at a single site on each cell. FIG. 18B is a graph 1820 with logarithmic horizontal axis 1822 indicating beat rate in inverse seconds and vertical axis 1824 indicating relative number of occurrences. Each curve 1830*a* through 1830*n* in the plot is the smoothed histogram of the rate of beats of a single cardiomyocyte derived from an hESC-CM measured at a single site on each cell. The histograms of the iPSC-CM show a broader range into slower rate contractions than do the histograms for hESC-CM. FIG. 187C is a graph 1840 with horizontal axis 1842 comprising portions 1842*a* and 1842*b* indicating two types of cardiomyocytes; and vertical axis 1844 indicating beat rate in inverse seconds. Statistical analysis is plotted showing means of individual cells (dots), plus 25th, 50th, and 75th percentile quantiles (box) and range of all points (whiskers). A p value from statistical comparison by t test is shown.

The mean beat rate of iPSC-CM is 0.80±0.17 beats/s (n=9) and slightly slower than that of hESC-CM at 1.06±0.23 beats/s (n=9) (p=0.015). The slight difference in beat widths is significant.

These measurements show that the cardiomyocytes derived from iPSC and hESC contract with similar mechanical properties and support the use of stem cell-derived cardiomyocytes as a model system, as well as the capability of the AFM techniques presented here to detect beat characteristics of living cardiomyocytes.

3.2.2 Clusters of Cardiomyocytes

Figure 19A:
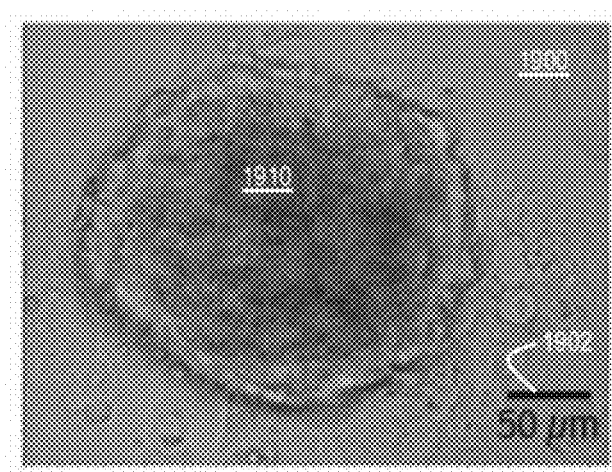
FIG. 19A is a micrograph that illustrates an example cluster of cardiomyocytes, according to an embodiment.

FIG. 19A is a brightfield micrograph 1900 that illustrates an example cluster 1910 of cardiomyocytes, according to an embodiment. The distance scale is given by the horizontal bar 1902 that represents 50 microns.

Figure 19B:
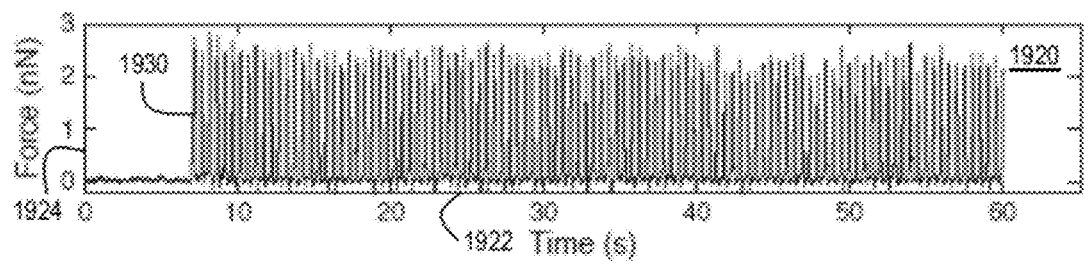
FIG. 19B is a graph that illustrates an example measured force time series when the AFM cantilever interacts with a cluster of living cardiomyocytes, according to an embodiment.

FIG. 19B is a graph 1920 that illustrates an example measured force time series when the AFM cantilever interacts with a cluster of living cardiomyocytes, according to an embodiment. The horizontal axis 1922 indicates time in seconds. The vertical axis 1924 indicates force in nanoNewtons. The trace 1930 is the contraction force trajectory, showing a large number of beats over about 52 seconds. These measurements indicate that such clusters are readily measured by the AFM techniques described herein.

Figure 19C:
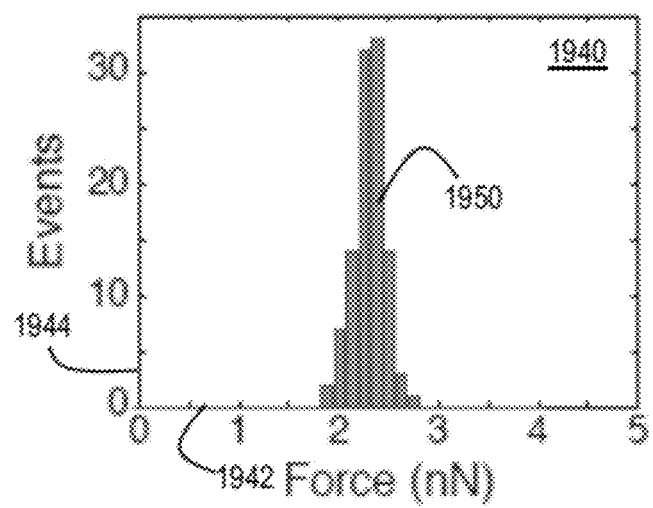
FIG. 19C through FIG. 19E are graphs that illustrate histograms of beat force, beat width and beat rate, respectively, for a cluster of living cardiomyocytes, according to an embodiment.
Figure 19D:
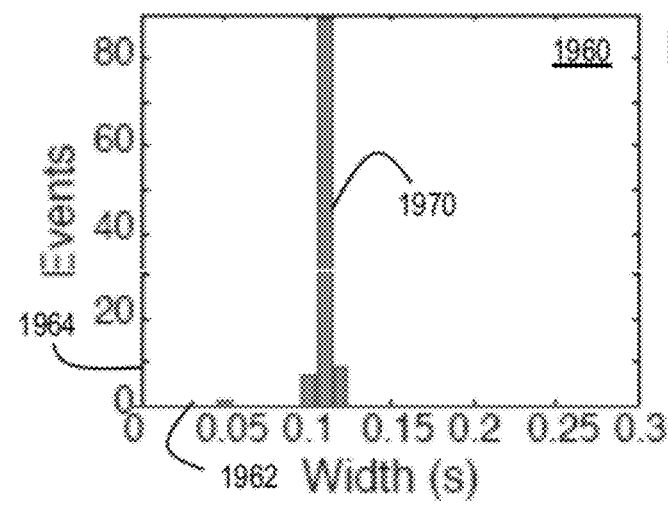
Figure 19E:
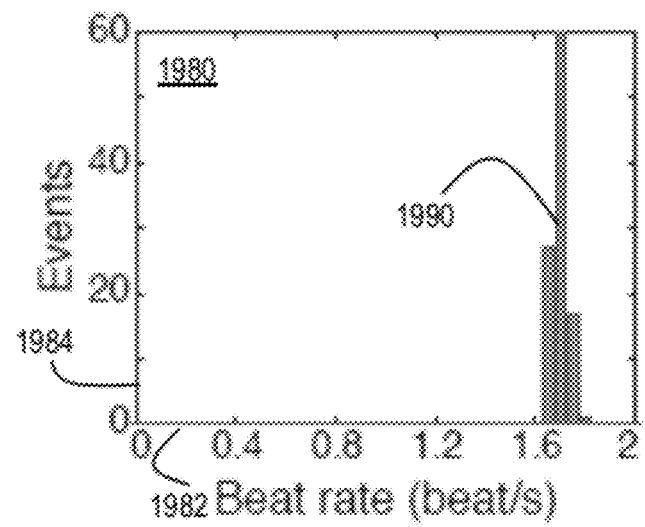

FIG. 19C through FIG. 19E are graphs that illustrate histograms of beat force, beat width and beat rate, respectively, for a cluster of living cardiomyocytes, according to an embodiment. FIG. 19C is a graph 1940 with a linear horizontal axis 1942 indicating beat force in nanoNewtons, and a vertical axis 1944 indicating number of events. The histogram 1950 shows the forces of beats of a single cluster of iPSC-CM measured at a single site on one cell in the cluster. FIG. 19D is a graph 1960 with a linear horizontal axis 1962 indicating beat width (duration) in seconds, and a vertical axis 1964 indicating number of events. The histogram 1970 shows the widths of beats of a single cluster of iPSC-CM measured at a single site on one cell in the cluster. FIG. 19E is a graph 1980 with a linear horizontal axis 1982 indicating beat rate in inverse seconds, and a vertical axis 1964 indicating number of events. The histogram 1990 shows the rates of beats of a single cluster of iPSC-CM measured at a single site on one cell in the cluster.

The contraction of the cardiomyocyte cluster shows very regular beat force, frequency and width, compared to the variation within and among solitary cells. The beating force of the cluster was 2.37±0.16 nN (n=106 beats), stronger than the force of single cells by an order of magnitude. The beating force of aggregated iPSC-CMs in a cluster is more uniform with a force coefficient of variation (CV)=4.8% (where CV=variance divided by the mean), in contrast to isolated iPSC CMs (CV=23%). Additionally, the cluster contracts with uniform rhythm: 1.72±0.03 beats/s (rate CV=1.7%) as compared to solitary iPSC-CM (CV=20%). The consistency of contraction force and frequency shows that cardiomyocytes behave more synchronously when in contact with other cardiomyocytes than when solitary.

3.2.3 Effects of Norepinephrine

To study the effect of NE, both solitary iPSC-CMs and hESC-CMs were treated with norepinephrine at 100 µmol/L concentration and measured beats before treatment and immediately following treatment. The contraction force of iPSC-cardiomyocytes increased significantly upon treatment with norepinephrine. The drug also affected the rhythm, though the chronotropic effect was weaker than the inotropic effect. For the hESC-cardiomyocytes, the contraction force increased after treatment with norepinephrine, but there was minimal effect on the beat rate.

Figure 20A:
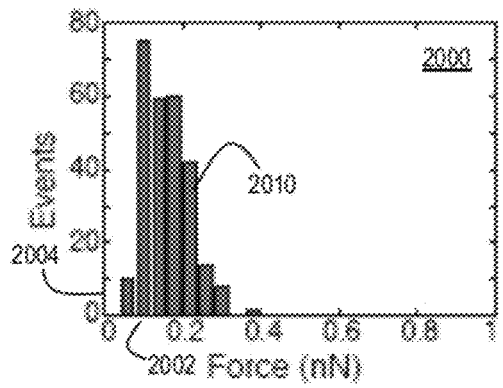
FIG. 20A through FIG. 20D are graphs that illustrate an example effect of norepinephrine on beat force of cardiomyocytes derived from iPSC and hESC-CM stem cells, according to various embodiments.
Figure 20B:
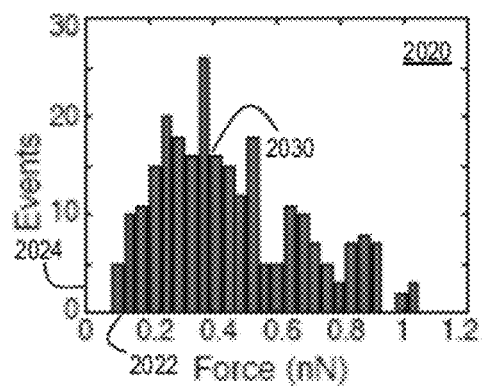

FIG. 20A through FIG. 20D are graphs that illustrate an example effect of norepinephrine on beat force of cardiomyocytes derived from iPSC and hESC-CM stem cells, according to various embodiments. FIG. 20A is a graph 2000 with horizontal axis 2002 indicating beat force in nanoNewtons and vertical axis 2004 indicating number of events. The histogram 2010 shows the distribution of beat force for iPSC-CM before treatment with norepinephrine. FIG. 20B is a graph 2020 with horizontal axis 2022 indicating beat force in nanoNewtons and vertical axis 2024 indicating number of events. The histogram 2030 shows the distribution of beat forces for iPSC-CM after treatment with norepinephrine. The contraction force of iPSC-cardiomyocytes increased significantly from 0.18±0.06 nN to 0.48±0.23 nN (p<0.001) upon treatment with norepinephrine.

Figure 20C:
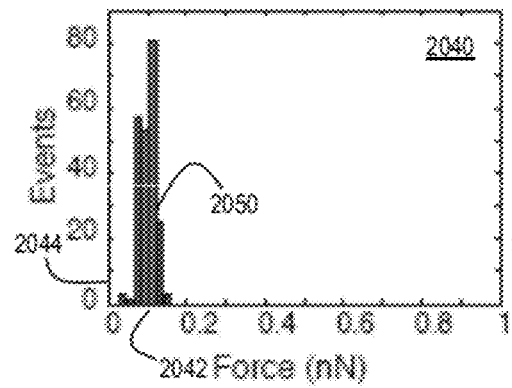
Figure 20D:
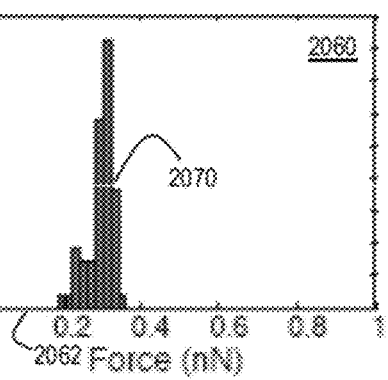

FIG. 20C is a graph 2040 with horizontal axis 2042 indicating beat force in nanoNewtons and vertical axis 2044 indicating number of events. The histogram 2050 shows the distribution of beat force for hESC-CM before treatment with norepinephrine. FIG. 20D is a graph 2060 with horizontal axis 2062 indicating beat force in nanoNewtons and vertical axis 2064 indicating number of events. The histogram 2070 shows the distribution of beat forces for hESC-CM after treatment with norepinephrine. For the hESC-cardiomyocytes, the contraction force increased from 0.097±0.019 nN to 0.31±0.03 nN (p<0.001) after treatment with norepinephrine.

Figure 21A:
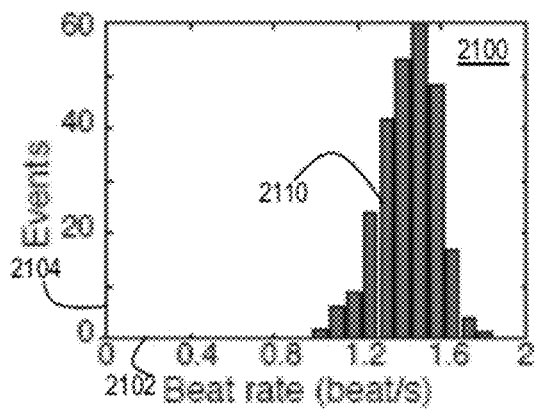
FIG. 21A through FIG. 21D are graphs that illustrate an example effect of norepinephrine on beat rate of cardiomyocytes derived from iPSC and hESC-CM stem cells, according to various embodiments.
Figure 21B:
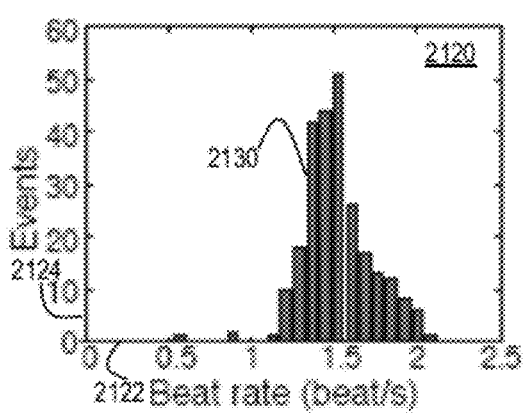

FIG. 21A through FIG. 21D are graphs that illustrate an example effect of norepinephrine on beat rate of cardiomyocytes derived from iPSC and hESC-CM stem cells, according to various embodiments. FIG. 21A is a graph 2100 with horizontal axis 2102 indicating beat rate in inverse seconds and vertical axis 2104 indicating number of events. The histogram 2110 shows the distribution of beat rates for iPSC-CM before treatment with norepinephrine. FIG. 21B is a graph 2120 with horizontal axis 2122 indicating beat rate in inverse seconds and vertical axis 2124 indicating number of events. The histogram 2130 shows the distribution of beat rates for iPSC-CM after treatment with norepinephrine.

After applying NE, 21% of beats of iPSC-CM were faster than a cutoff of 1.7 beats/s as compared to 6% prior to treatment. Thus, the drug also affected the rhythm, though the chronotropic effect was weaker than the inotropic effect.

Figure 21C:
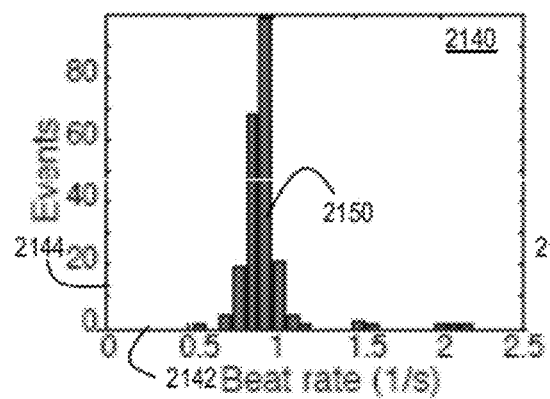
Figure 21D:
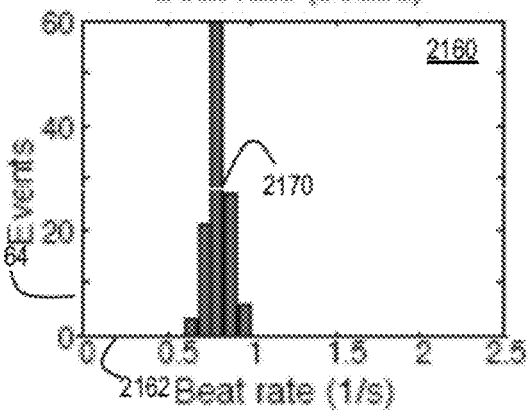

FIG. 21C is a graph 2140 with horizontal axis 2142 indicating beat rate in inverse seconds and vertical axis 2144 indicating number of events. The histogram 2150 shows the distribution of beat rates for hESC-CM before treatment with norepinephrine. FIG. 21D is a graph 2160 with horizontal axis 2162 indicating beat rate in inverse seconds and vertical axis 2164 indicating number of events. The histogram 2170 shows the distribution of beat rates for hESC-CM after treatment with norepinephrine. For the hESC-cardiomyocytes, there was minimal effect on the beat rate after treatment with norepinephrine.

These data show that the AFM techniques presented here can be used to measure both inotropic and chronotropic effects of exogenous agents.

3.2.4 Differences in Diseased Cardiomyocytes

Defects in the mechanical properties of CMs may lead to cardiomyopathies. Dilated cardiomyopathy (DCM) is a life-threatening genetic disorder arising from mutations of cardiac troponin T (cTnT), cTnT binds $Ca^{2+}$ and plays a critical role in the contraction of cardiomyocytes. iPSC-CM derived from patients with DCM show significantly decreased force, but comparable rate and beat duration to iPSC-CM derived from healthy siblings.

FIG. 22A through FIG. 22C are graphs that illustrate example differences among beat force, frequency and duration, respectively, of cardiomyocytes derived from control patients and diseased patients, according to various embodiments. The horizontal axis 2202 in each graph indicates whether the data is from a healthy (control) iPSC-CM or a diseased (DCM) iPSC-CM. The vertical axis 2204 in FIG. 22A indicates beat force in nanoNewtons (nN). The beat forces measured for control CM are indicated by points 2212 and those for DCM CM are indicated by points 2214. As can be seen, PSC-CM derived from patients with DCM show significantly decreased force compared to iPSC-CM derived from healthy siblings (p=0.026).

The vertical axis 2224 in FIG. 22B indicates beat frequency in Hertz (Hz). The beat frequencies measured for control CM are indicated by points 2232 and those for DCM CM are indicated by points 2234. The vertical axis 2244 in FIG. 22C indicates beat duration in seconds (s). The beat durations measured for control CM are indicated by points 2252 and those for DCM CM are indicated by points 2254. The percent differences in beat frequency and duration are much smaller than differences in beat force and appear to be not significant (p=NS).

In an experimental embodiment, dwell maps of iPSC-CM derived from patients with DCM were measured and different phenotypes were found compared to dwell maps of healthy iPSC-CM.

Figure 23:
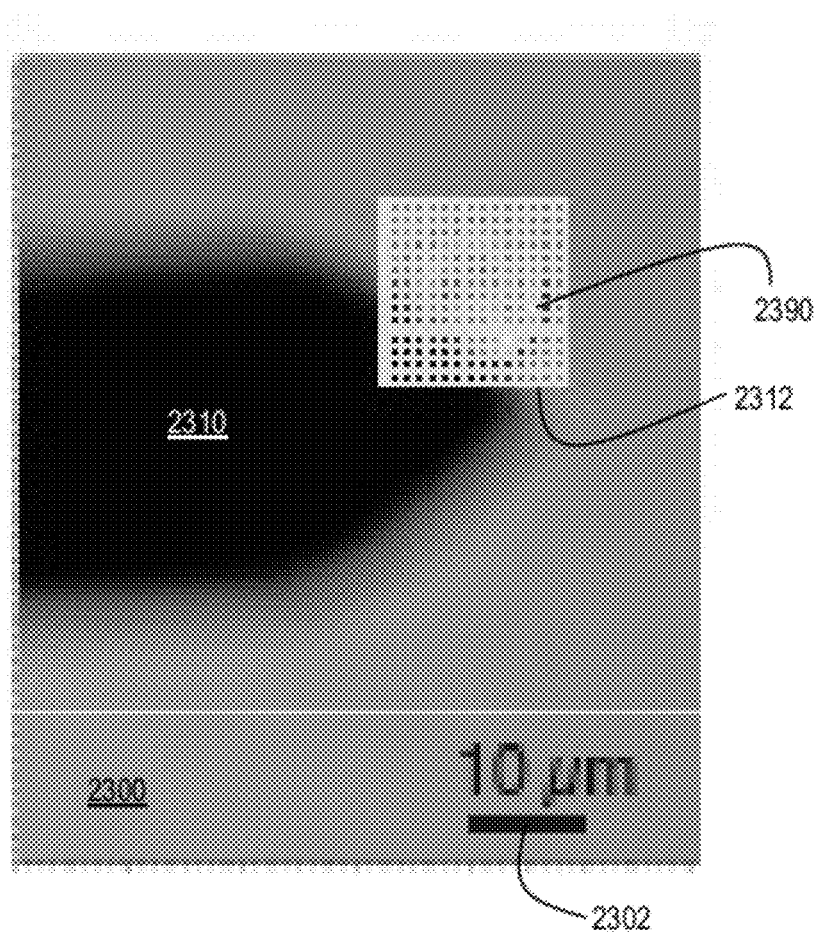
FIG. 23 is a diagram that illustrates a micrograph of an example AFM cantilever disposed over an example cardiomyocyte derived from iPSC and an example grid that illustrates a range of a dwell map, according to an embodiment.

FIG. 23 is a diagram that illustrates a micrograph 2300 of an example AFM cantilever disposed over an example cardiomyocyte derived from iPSC and an example grid that illustrates a range of a dwell map, according to an embodiment. Micrograph 2300 is a brightfield image with distance scale given by horizontal bar 2302 indicating 10 microns. The image depicts an AFM microscale cantilever 2310. A iPSC-CM 2390 is positioned adjacent to the cantilever 2310. The surface of the cell 2390 is sampled at the locations of the grid 2312 to form a dwell map of beat characteristics and stiffness, as described above. The dwell maps showed that the periphery of the cell had higher contraction forces and stiffness compared to the central areas.

Figure 24:
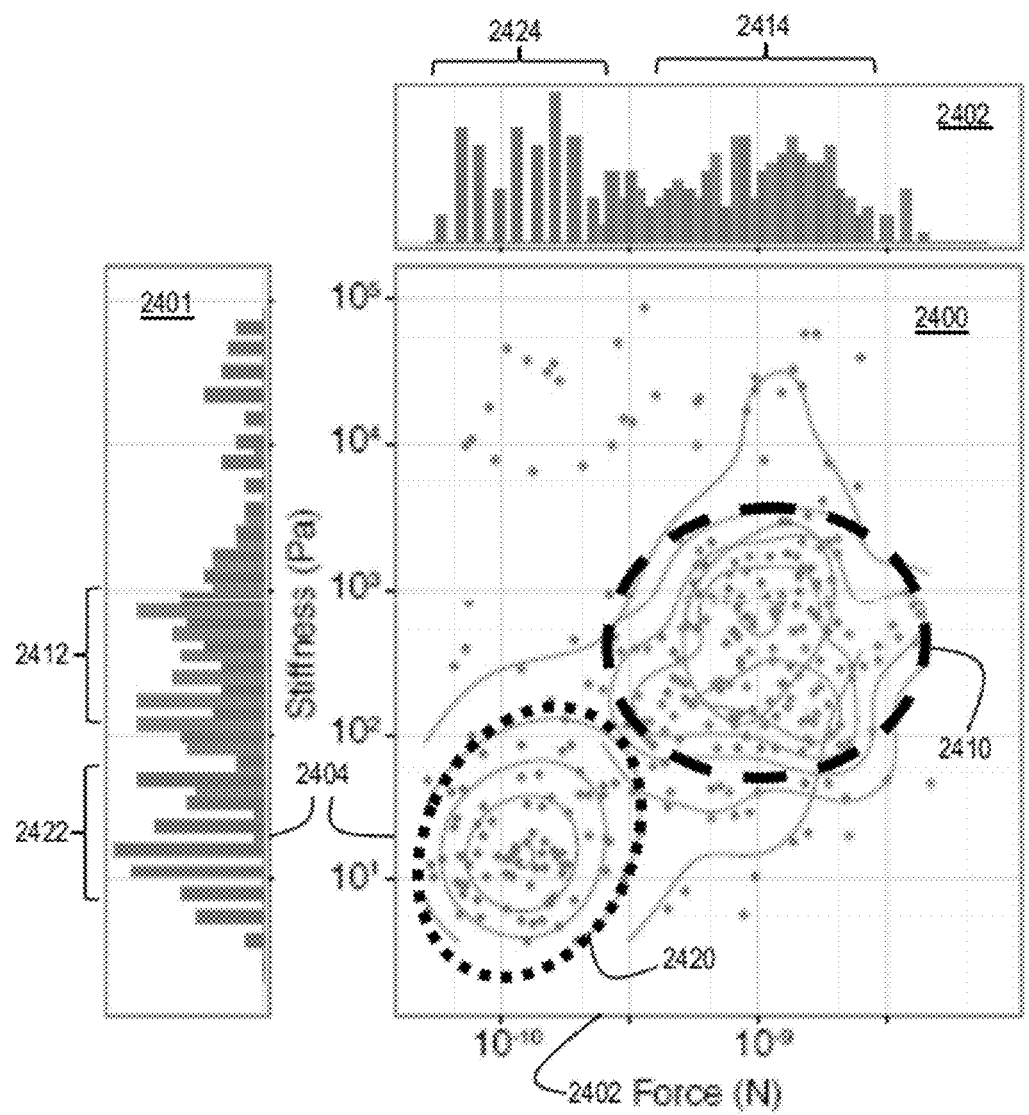
FIG. 24 is diagram that illustrates example graphs of beat force and local stiffness measurements obtained from dwell maps of cardiomyocytes derived from either a healthy control subject or from a subject with dilated cardiomyopathy, according to various embodiments.

FIG. 24 is diagram that illustrates example graphs of beat force and local stiffness measurements obtained from dwell maps of cardiomyocytes derived from either a healthy control subject or from a subject with dilated cardiomyopathy (DCM), according to various embodiments. The diagram shows the relation of beat force and stiffness values measured at multiple locations on the surface of an iPSC-CM for both a healthy individual and a person suffering from DCM. Graph 2400 has a logarithmic horizontal axis 2402 that indicates beat force in Newtons, and a logarithmic vertical axis 2404 that indicates Young's modulus as a measure of local stiffness in pascal (Pa, 1 Pa=1 Newton per square meter). Single points on the plot correspond to beat force and stiffness measured at each grid point of the dwell map of one cell. The points obtained from the iPSC-CM of a healthy person reside primarily in an area enclosed by the dashed oval 2410. The points obtained from the iPSC-CM of a person suffering from DCM collect in two areas, one primarily in the same area enclosed by the dashed oval 2410, and a second group of values are found in the different area enclosed by the dotted oval 2420 associated with lower values of both beat force and stiffness.

The diagram also includes a graph 2401 that shows a histogram of local stiffness values, with alternating bars representing healthy iPSC-CM and DCM iPSC-CM. Small stiffness portion 2422 of the histogram is dominated by DCM iPSC-CM, while high stiffness portion 2412 is populated by both healthy iPSC-CM and, to a lesser extent, DCM iPSC-CM.

The diagram also includes a graph 24021 that shows a histogram of beat forces values, with alternating bars representing healthy iPSC-CM and DCM iPSC-CM. Small beat force portion 2424 of the histogram is dominated by DCM iPSC-CM, while high beat force portion 2414 is populated by both healthy iPSC-CM and, to a lesser extent, DCM iPSC-CM.

FIG. 24 shows that beats measured from most portions of the healthy iPSC-CM fall in a region of moderate stiffness (50-5 kPa) and strong force (about 1 nN), whereas some points of the dwell map of DCM iPSC-CM showed comparatively lower beat forces and lower stiffness. Points where there was no contraction force measured (e.g., on the glass slide surrounding the cell) were not shown. Corresponding histograms flank the contour plot.

The contraction force histogram and Young's modulus histogram obtained from dwell maps of DCM iPSC-CM show bi-modal distributions. By contrast, the force histogram obtained from dwell maps of the healthy control iPSC-CM shows a single population of points in terms of beating force and stiffness. These results from dwell-mapping show that iPSC-CM from patients with DCM show increased populations of points of low stiffness and weak contraction, suggesting that mutation of cTnT both compromises filament structure and weakens contractile force.

Techniques have been described for using atomic force microscopy (AFM) to quantify the mechanobiological properties of pluripotent, stem cell-derived cardiomyocytes, including contraction force, rate, duration and membrane stiffness. Beats from cardiomyocytes derived from induced pluripotent stem cells and from embryonic cells of healthy subjects and those with dilated cardiomyopathy are measured in various embodiments. It is found that these embodiments quantify beat forces of single cells and clusters of cardiomyocytes, and detect the inotropic effect of norepinephrine. Cardiomyocytes derived from subjects with dilated cardiomyopathy show decreased force and decrease membrane stiffness compared to controls. Thus, various embodiments can serve as a screening tool for the development of cardiac-active pharmacological agents, as a platform for studying cardiomyocyte biology, or as a mechanism to fine-tune the choices of treatments for patients in heart failure The results demonstrate several uses of the AFM techniques of various embodiments to the study of cardiomyocytes. By setting the AFM probe to dwell on the cell, various embodiments quantitatively measure the cell's mechanical phenotypes, including the contractile force, beat rate and beat duration by avoiding fluidic disturbances that hampered previous attempts to study cardiomyocytes by AFM. An important problem in the development of new cardiac agents is to determine whether a compound has inotropic (affecting force generation) or chronotropic (affecting rate) effects on the cardiomyocytes. Various AFM-based techniques presented here quantify these effects separately, and thus are able to revolutionize pre-clinical studies of candidate drugs. Because various embodiments of these techniques combine measurement of stiffness, beat force, and rate, they may be superior to techniques that measure beat rates or displacements of single cells by imaging positional changes of surface beads or by vide-microscopy of the cell edges. Some embodiments of these techniques could be used to analyze cells from patients with cardiomyopathy to fine-tune choices of medications. Dwell mapping was used to identify heterogeneity of the contraction and stiffness of healthy and diseased iPSC-CMs, providing insight to the underlying pathophysiology of diseased cardiomyocytes. Overall, the experimental embodiments show that AFM can be applied in flexible ways to inform fundamental, applied, and clinical cardiac studies.

4. Overview of Computational Equipment

Figure 25:
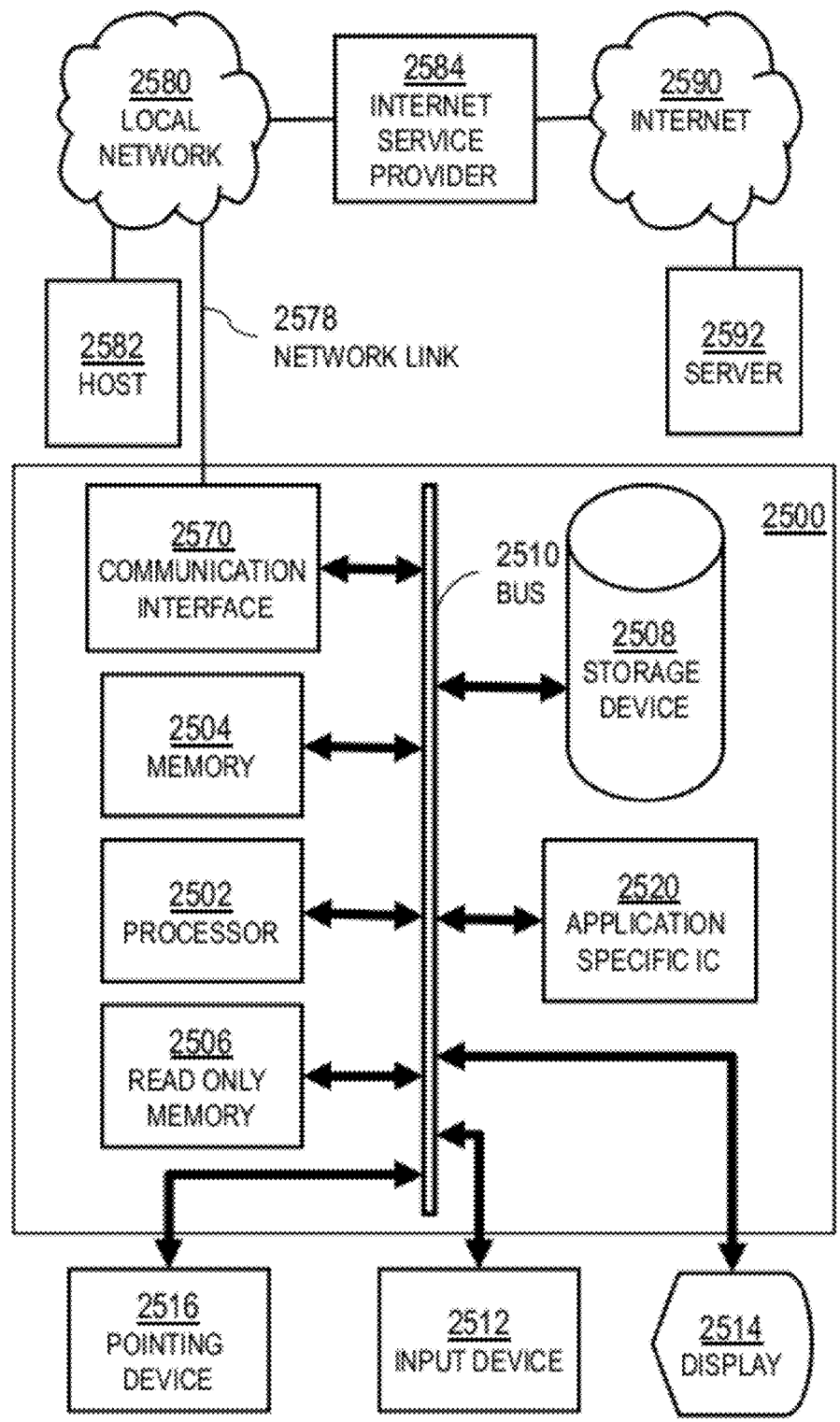
FIG. 25 is a block diagram that illustrates a computer system upon which an embodiment of the invention may be implemented.

FIG. 25 is a block diagram that illustrates a computer system 2500 upon which an embodiment of the invention may be implemented. Computer system 2500 includes a communication mechanism such as a bus 2510 for passing information between other internal and external components of the computer system 2500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 2500, or a portion thereof, constitutes a means for performing one or more steps of one or more methods described herein.

A sequence of binary digits constitutes digital data that is used to represent a number or code for a character. A bus 2510 includes many parallel conductors of information so that information is transferred quickly among devices coupled to the bus 2510. One or more processors 2502 for processing information are coupled with the bus 2510. A processor 2502 performs a set of operations on information. The set of operations include bringing information in from the bus 2510 and placing information on the bus 2510. The set of operations also typically include comparing two or more units of information, shifting positions of units of information, and combining two or more units of information, such as by addition or multiplication. A sequence of operations to be executed by the processor 2502 constitute computer instructions.

Computer system 2500 also includes a memory 2504 coupled to bus 2510. The memory 2504, such as a random access memory (RAM) or other dynamic storage device, stores information including computer instructions. Dynamic memory allows information stored therein to be changed by the computer system 2500. RAM allows a unit of information stored at a location called a memory address to be stored and retrieved independently of information at neighboring addresses. The memory 2504 is also used by the processor 2502 to store temporary values during execution of computer instructions. The computer system 2500 also includes a read only memory (ROM) 2506 or other static storage device coupled to the bus 2510 for storing static information, including instructions, that is not changed by the computer system 2500. Also coupled to bus 2510 is a non-volatile (persistent) storage device 2508, such as a magnetic disk or optical disk, for storing information, including instructions, that persists even when the computer system 2500 is turned off or otherwise loses power.

Information, including instructions, is provided to the bus 2510 for use by the processor from an external input device 2512, such as a keyboard containing alphanumeric keys operated by a human user, or a sensor. A sensor detects conditions in its vicinity and transforms those detections into signals compatible with the signals used to represent information in computer system 2500. Other external devices coupled to bus 2510, used primarily for interacting with humans, include a display device 2514, such as a cathode ray tube (CRT) or a liquid crystal display (LCD), for presenting images, and a pointing device 2516, such as a mouse or a trackball or cursor direction keys, for controlling a position of a small cursor image presented on the display 2514 and issuing commands associated with graphical elements presented on the display 2514.

In the illustrated embodiment, special purpose hardware, such as an application specific integrated circuit (IC) 2520, is coupled to bus 2510. The special purpose hardware is configured to perform operations not performed by processor 2502 quickly enough for special purposes. Examples of application specific ICs include graphics accelerator cards for generating images for display 2514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 2500 also includes one or more instances of a communications interface 2570 coupled to bus 2510. Communication interface 2570 provides a two-way communication coupling to a variety of external devices that operate with their own processors, such as printers, scanners and external disks. In general the coupling is with a network link 2578 that is connected to a local network 2580 to which a variety of external devices with their own processors are connected. For example, communication interface 2570 may be a parallel port or a serial port or a universal serial bus (USB) port on a personal computer. In some embodiments, communications interface 2570 is an integrated services digital network (ISDN) card or a digital subscriber line (DSL) card or a telephone modem that provides an information communication connection to a corresponding type of telephone line. In some embodiments, a communication interface 2570 is a cable modem that converts signals on bus 2510 into signals for a communication connection over a coaxial cable or into optical signals for a communication connection over a fiber optic cable. As another example, communications interface 2570 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 2570 sends and receives electrical, acoustic or electromagnetic signals, including infrared and optical signals, that carry information streams, such as digital data.

The term computer-readable medium is used herein to refer to any medium that participates in providing information to processor 2502, including instructions for execution. Such a medium may take many forms, including, but not limited to, non-volatile media, volatile media and transmission media. Non-volatile media include, for example, optical or magnetic disks, such as storage device 2508. Volatile media include, for example, dynamic memory 2504. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 2502, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Logic encoded in one or more tangible media includes one or both of processor instructions on a computer-readable storage media and special purpose hardware, such as ASIC 2520.

Network link 2578 typically provides information communication through one or more networks to other devices that use or process the information. For example, network link 2578 may provide a connection through local network 2580 to a host computer 2582 or to equipment 2584 operated by an Internet Service Provider (ISP). ISP equipment 2584 in turn provides data communication services through the public, world-wide packet-switching communication network of networks now commonly referred to as the Internet 2590. A computer called a server 2592 connected to the Internet provides a service in response to information received over the Internet. For example, server 2592 provides information representing video data for presentation at display 2514.

The invention is related to the use of computer system 2500 for implementing the techniques described herein. According to one embodiment of the invention, those techniques are performed by computer system 2500 in response to processor 2502 executing one or more sequences of one or more instructions contained in memory 2504. Such instructions, also called software and program code, may be read into memory 2504 from another computer-readable medium such as storage device 2508. Execution of the sequences of instructions contained in memory 2504 causes processor 2502 to perform the method steps described herein. In alternative embodiments, hardware, such as application specific integrated circuit 2520, may be used in place of or in combination with software to implement the invention. Thus, embodiments of the invention are not limited to any specific combination of hardware and software.

The signals transmitted over network link 2578 and other networks through communications interface 2570, carry information to and from computer system 2500. Computer system 2500 can send and receive information, including program code, through the networks 2580, 2590 among others, through network link 2578 and communications interface 2570. In an example using the Internet 2590, a server 2592 transmits program code for a particular application, requested by a message sent from computer 2500, through Internet 2590, ISP equipment 2584, local network 2580 and communications interface 2570. The received code may be executed by processor 2502 as it is received, or may be stored in storage device 2508 or other non-volatile storage for later execution, or both. In this manner, computer system 2500 may obtain application program code in the form of a signal on a carrier wave.

Various forms of computer readable media may be involved in carrying one or more sequence of instructions or data or both to processor 2502 for execution. For example, instructions and data may initially be carried on a magnetic disk of a remote computer such as host 2582. The remote computer loads the instructions and data into its dynamic memory and sends the instructions and data over a telephone line using a modem. A modem local to the computer system 2500 receives the instructions and data on a telephone line and uses an infra-red transmitter to convert the instructions and data to a signal on an infra-red a carrier wave serving as the network link 2578. An infrared detector serving as communications interface 2570 receives the instructions and data carried in the infrared signal and places information representing the instructions and data onto bus 2510. Bus 2510 carries the information to memory 2504 from which processor 2502 retrieves and executes the instructions using some of the data sent with the instructions. The instructions and data received in memory 2504 may optionally be stored on storage device 2508, either before or after execution by the processor 2502.

FIG. 26 illustrates a chip set 2600 upon which an embodiment of the invention may be implemented. Chip set 2600 is programmed to perform one or more steps of a method described herein and includes, for instance, the processor and memory components described with respect to FIG. 25 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 2600, or a portion thereof, constitutes a means for performing one or more steps of a method described herein.

In one embodiment, the chip set 2600 includes a communication mechanism such as a bus 2601 for passing information among the components of the chip set 2600. A processor 2603 has connectivity to the bus 2601 to execute instructions and process information stored in, for example, a memory 2605. The processor 2603 may include one or more processing cores with each core configured to perform independently. A multi-core processor enables multiprocessing within a single physical package. Examples of a multi-core processor include two, four, eight, or greater numbers of processing cores. Alternatively or in addition, the processor 2603 may include one or more microprocessors configured in tandem via the bus 2601 to enable independent execution of instructions, pipelining, and multithreading. The processor 2603 may also be accompanied with one or more specialized components to perform certain processing functions and tasks such as one or more digital signal processors (DSP) 2607, or one or more application-specific integrated circuits (ASIC) 2609. A DSP 2607 typically is configured to process real-world signals (e.g., sound) in real time independently of the processor 2603. Similarly, an ASIC 2609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 2603 and accompanying components have connectivity to the memory 2605 via the bus 2601. The memory 2605 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 2605 also stores the data associated with or generated by the execution of one or more steps of the methods described herein.

5. Alternatives and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
    functionalizing a nanoscale tip of a microscale cantilever with a first ligand for a first receptor associated with a surface of a first type of cell; and
    controlling the cantilever to cause the first ligand on the nanoscale tip to contact the first receptor on a surface of a living cell of the first type in a particular temporal pattern to induce a desired response by the living cell.

2. A method as recited in claim 1, further comprising determining an effected response by the living cell.

3. A method as recited in claim 2, wherein determining an effected response by the living cell further comprises operating a microscope to image the living cell.

4. A method as recited in claim 3, wherein operating the microscope to image the living cell further comprising reducing vibrations from the microscope from reaching the living cell or microscale cantilever.

5. A method as recited in claim 1, further comprising corralling the living cell in a microscale well.

6. A method as recited in claim 1, wherein:
    the first type of cell is an T-cell of a mammalian immune system;
    the desired response by the living cell is an immune response to the ligand; and
    the method further comprises administering the living cell to a subject to induce an immune response to the ligand in the subject.

7. An apparatus comprising
    an atomic force microscope comprising a microscale cantilever on which is disposed a nanoscale tip functionalized with a first ligand for a first receptor associated with a surface of a first type of cell; and
    a stage comprising a microscale well for corralling a living cell of the first type,
    wherein the stage can be positioned relative to the functionalized tip of the microscale cantilever.

8. An apparatus as recited in claim 6, further comprising a confocal optical microscope, wherein the stage is disposed in a focal plane of the confocal optical microscope.

9. An apparatus as recited in claim 7, wherein the confocal optical microscope is a spinning disk confocal optical microscope and the apparatus further comprises an acoustical isolation component between the stage and a spinning disk of the spinning disk confocal optical microscope.

10. An apparatus as recited in claim 8, wherein the acoustical isolation component further comprises at least one of a massive slab or an active vibration cancellation system.

11. A computer-readable medium carrying one or more sequences of instructions for controlling an atomic force microscope comprising a microscale cantilever on which is disposed a nanoscale tip functionalized with a first ligand for a first receptor associated with a surface of a first type of cell, wherein execution of the one or more sequences of instructions by one or more processors causes an apparatus to perform the step of:
    controlling the cantilever to cause the first ligand on the nanoscale tip to contact the first receptor on a surface of a living cell of the first type in a particular temporal pattern to induce a desired response by the living cell.

12. A method comprising:
    mounting a living cardiomyocyte on a stage of a microscale cantilever with a nanoscale tip;
    operating a controller for the microscale cantilever to cause the nanoscale tip to contact the cardiomyocyte at a predetermined pressure;
    operating the controller to turn off vertical deflection feedback after contacting the cardiomyocyte; and
    after turning off vertical deflection feedback, collecting deflection data that indicates a time series of nanoscale vertical deflections of the microscale cantilever caused by the living cardiomyocyte.

13. A method as recited in claim 12, further comprising calibrating a spring constant for the microscale cantilever.

14. A method as recited in claim 12, further comprising determining beat characteristics of the cardiomyocyte based on the deflection data.

15. A method as recited in claim 14, wherein the beat characteristics include at least one of a peak force, a peak duration or a peak frequency.

16. A method as recited in claim 14, further comprising:
    treating the living cardiomyocyte; and
    determining efficacy of treatment based on a change in beat characteristics of the living cardiomyocyte before and after treatment.

17. A method as recited in claim 12, wherein mounting the living cardiomyocyte on the stage further comprises growing the cardiomyocyte in a gel on the stage.

18. A method as recited in claim 12, wherein mounting the living cardiomyocyte on the stage further comprises growing a cluster of cardiomyocytes in a gel on the stage.

19. A method as recited in claim 18, further comprising determining beat characteristics of the cluster based on the deflection data.

20. A method as recited in claim 12, wherein the living cardiomyocyte is grown from at least one of an induced pluripotent stem cell (IPSC) or an human embryonic stem cell (hESC).

21. An apparatus comprising:
   an atomic force microscope comprising a microscale cantilever on which is disposed a nanoscale tip;
   a stage configured to be moveably positioned relative to the nanoscale tip of the microscale cantilever in microscale steps; and
   a confocal optical microscope, wherein the stage is disposed so that a sample on the stage is disposed in a focal plane of the confocal optical microscope; wherein the confocal optical microscope is a spinning disk confocal optical microscope and the apparatus further comprises an acoustical isolation component between the stage and a spinning disk of the spinning disk confocal optical microscope.

22. A computer-readable medium carrying one or more sequences of instructions for controlling an atomic force microscope comprising a microscale cantilever on which is disposed a nanoscale tip, wherein execution of the one or more sequences of instructions by one or more processors causes an apparatus to perform the steps of:
   controlling the cantilever to cause the nanoscale tip to contact a living cardiomyocyte at a predetermined pressure;
   controlling the cantilever to turn off vertical deflection feedback after contacting the cardiomyocyte; and
   collecting deflection data that indicates a time series of nanoscale vertical deflections of the microscale cantilever caused by the living cardiomyocyte.

* * * * *